United States Patent [19]

McDaniel et al.

[11] 4,334,501

[45] Jun. 15, 1982

[54] ANIMAL SHELTER AND FEED DISPENSER

[76] Inventors: Diana G. McDaniel; Bruce M. McDaniel, both of 427 NW. 20th St., Oklahoma City, Okla. 73103

[21] Appl. No.: 170,823

[22] Filed: Jul. 21, 1980

[51] Int. Cl.³ ............................................. A01K 1/02
[52] U.S. Cl. ..................................... 119/16; 119/19
[58] Field of Search ................. 119/15, 16, 18, 19, 119/21, 52 R

[56] References Cited

U.S. PATENT DOCUMENTS

| | | | |
|---|---|---|---|
| 978,010 | 12/1910 | Faust | 119/19 |
| 1,455,105 | 5/1923 | Butcher | 119/19 |
| 1,977,467 | 10/1934 | Bomberger et al. | 119/19 |
| 3,099,978 | 8/1963 | George | 119/19 |
| 3,256,860 | 6/1966 | Parker | 119/19 |

Primary Examiner—Hugh R. Chamblee
Attorney, Agent, or Firm—Dunlap, Codding & McCarthy

[57] ABSTRACT

An improved animal shelter having a feed dispenser is provided wherein the feed dispenser is disposable on one of the side walls, and preferably forms one of the sidewalls of the improved animal shelter. The feed dispenser includes a body member having a cavity formed wherein, the cavity extending from an upper end of the body member to the lower end of the body member. A feed trough is disposed adjacent the lower end of the body member so as to be in open communication with the cavity formed in the body member. Thus, animal feed can be disposed in the cavity of the body portion and stored therein for delivery to the feed trough.

50 Claims, 21 Drawing Figures

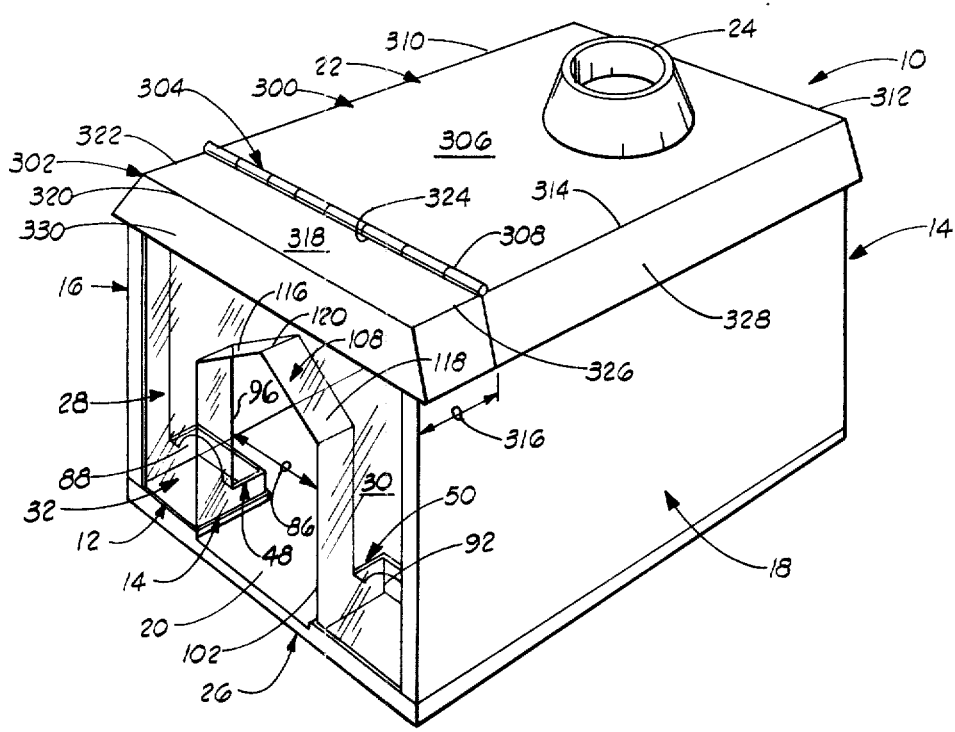
FIG. 1
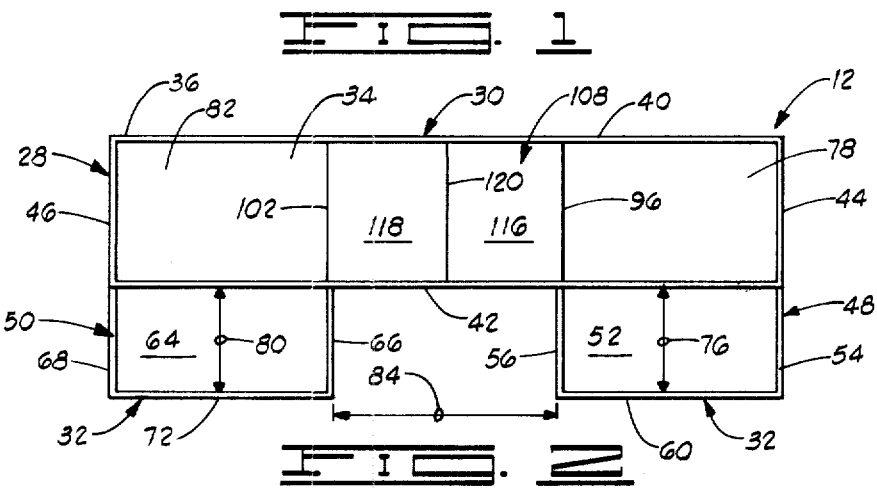
FIG. 2
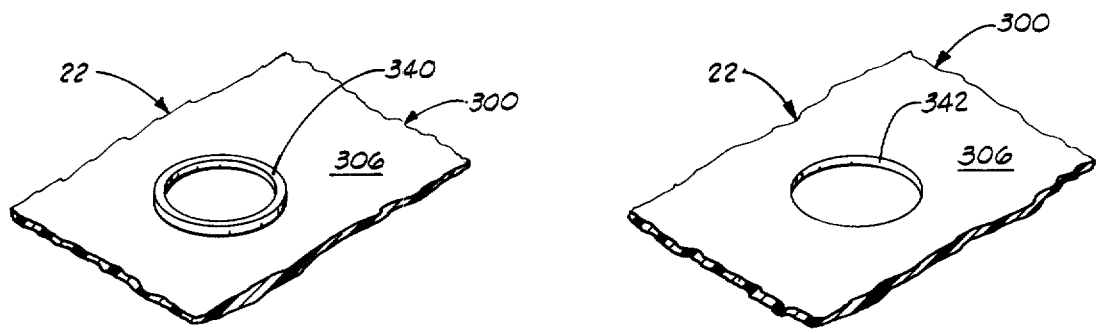
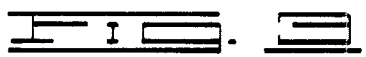
FIG. 3
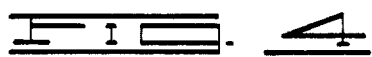
FIG. 4

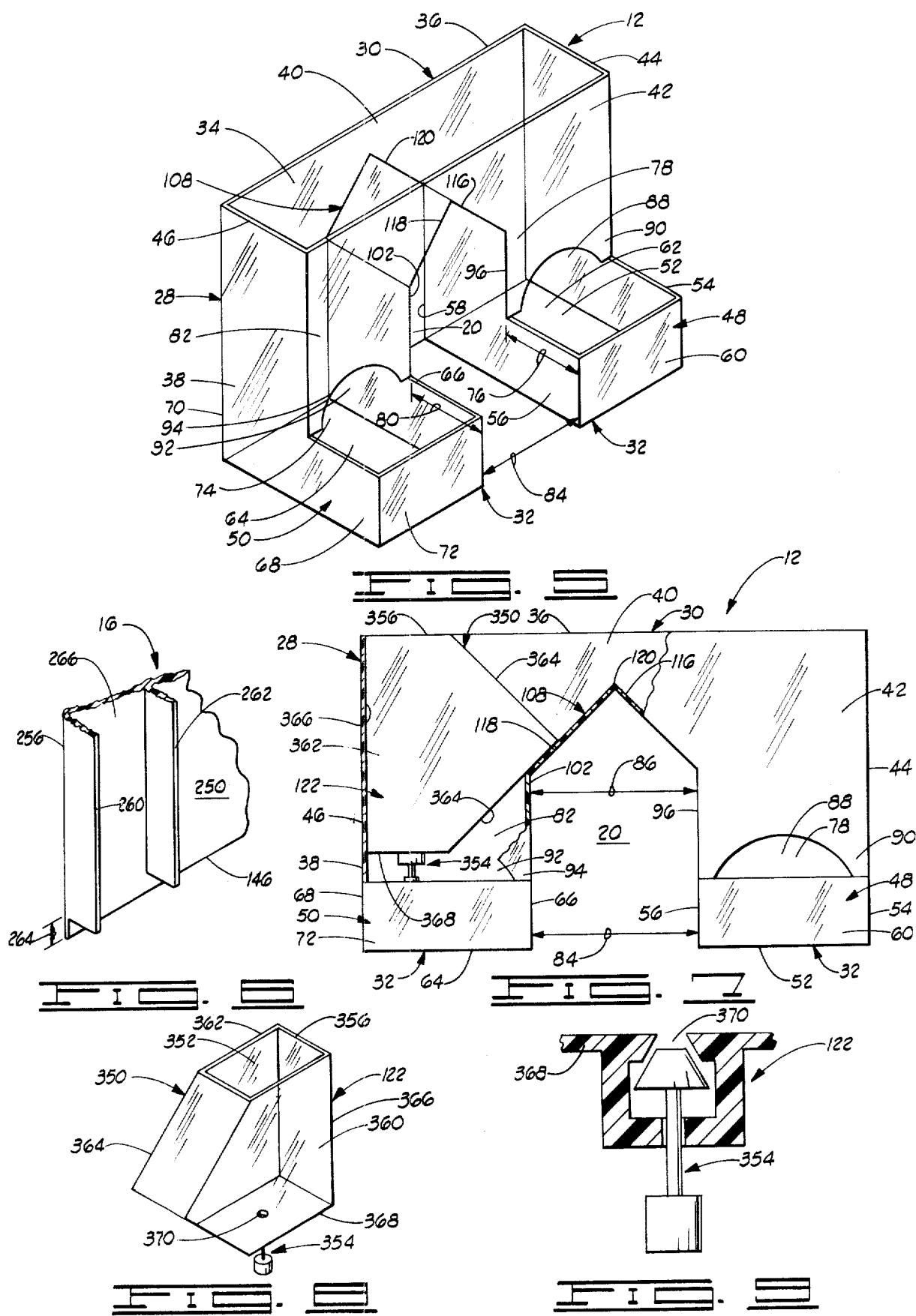

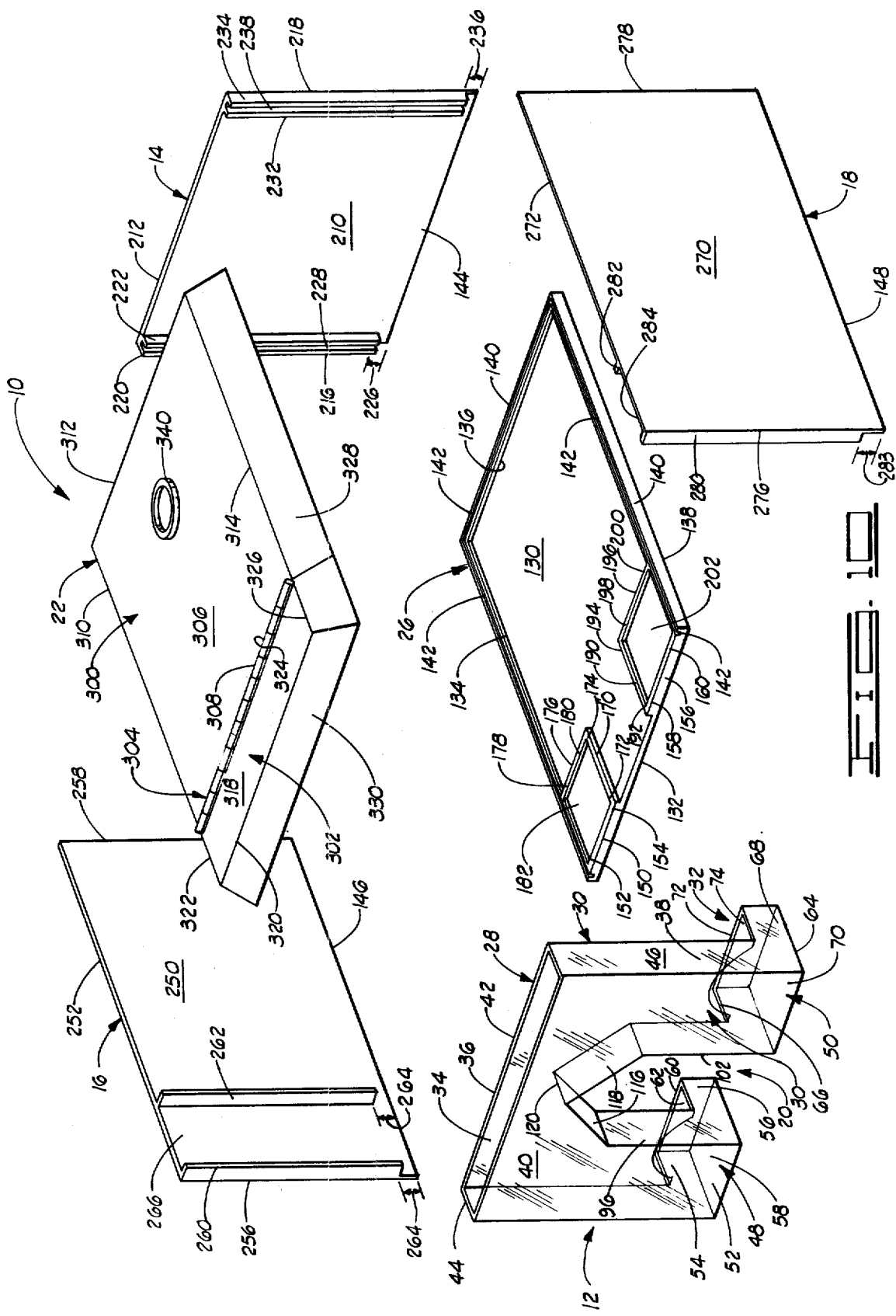

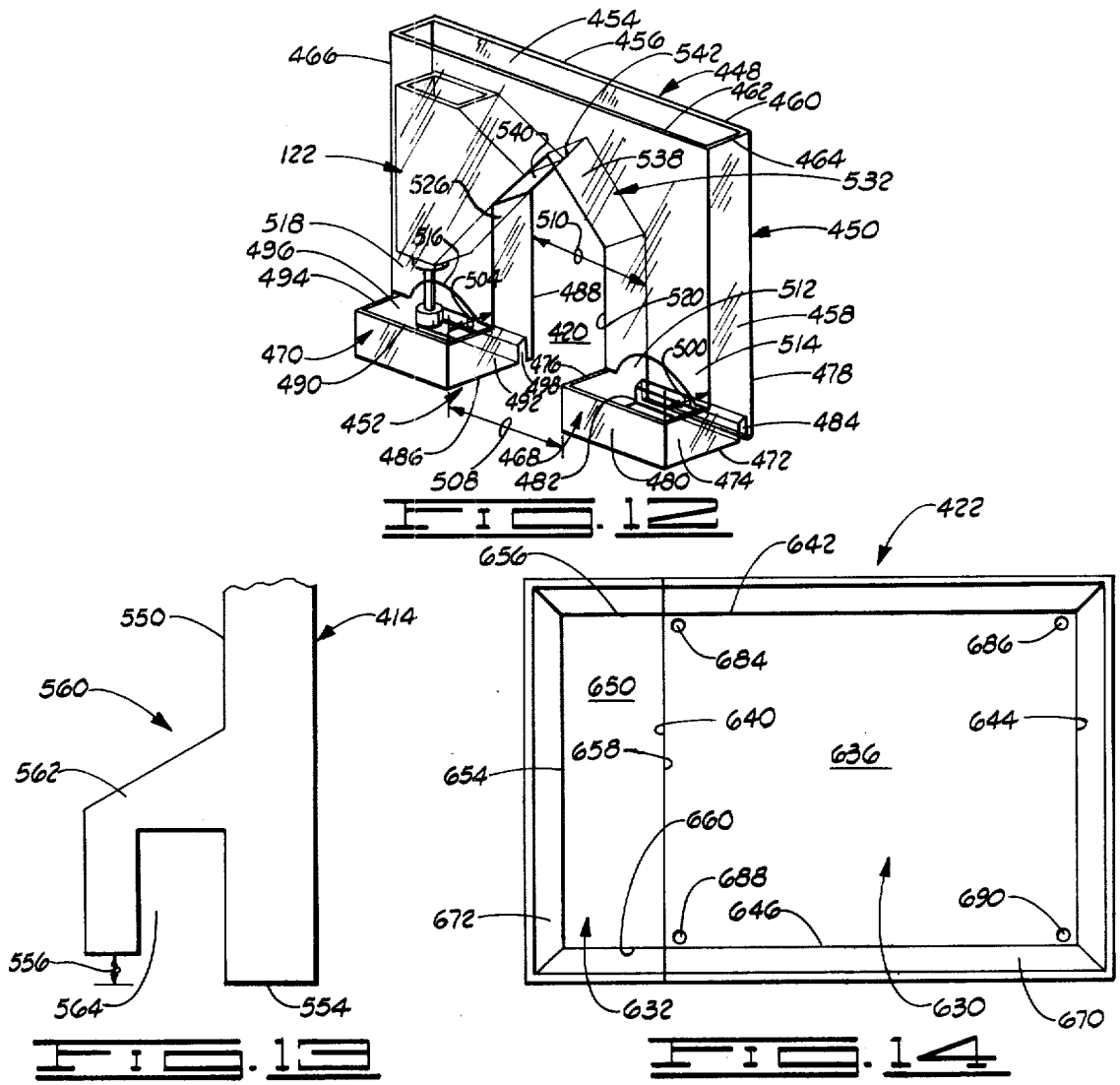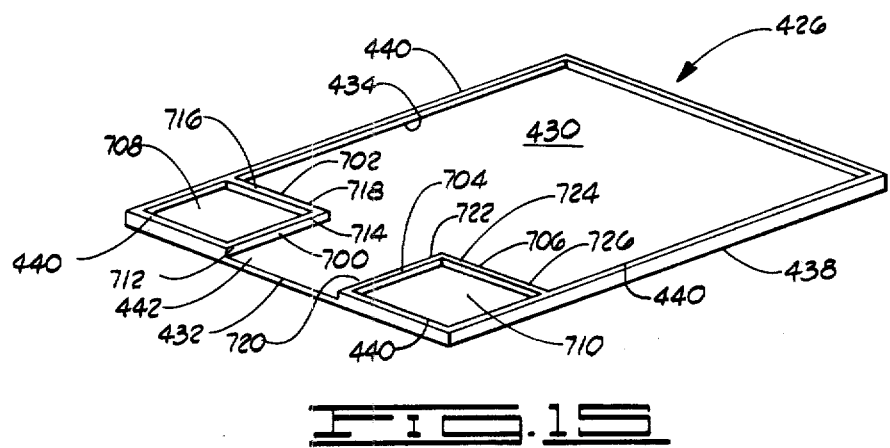

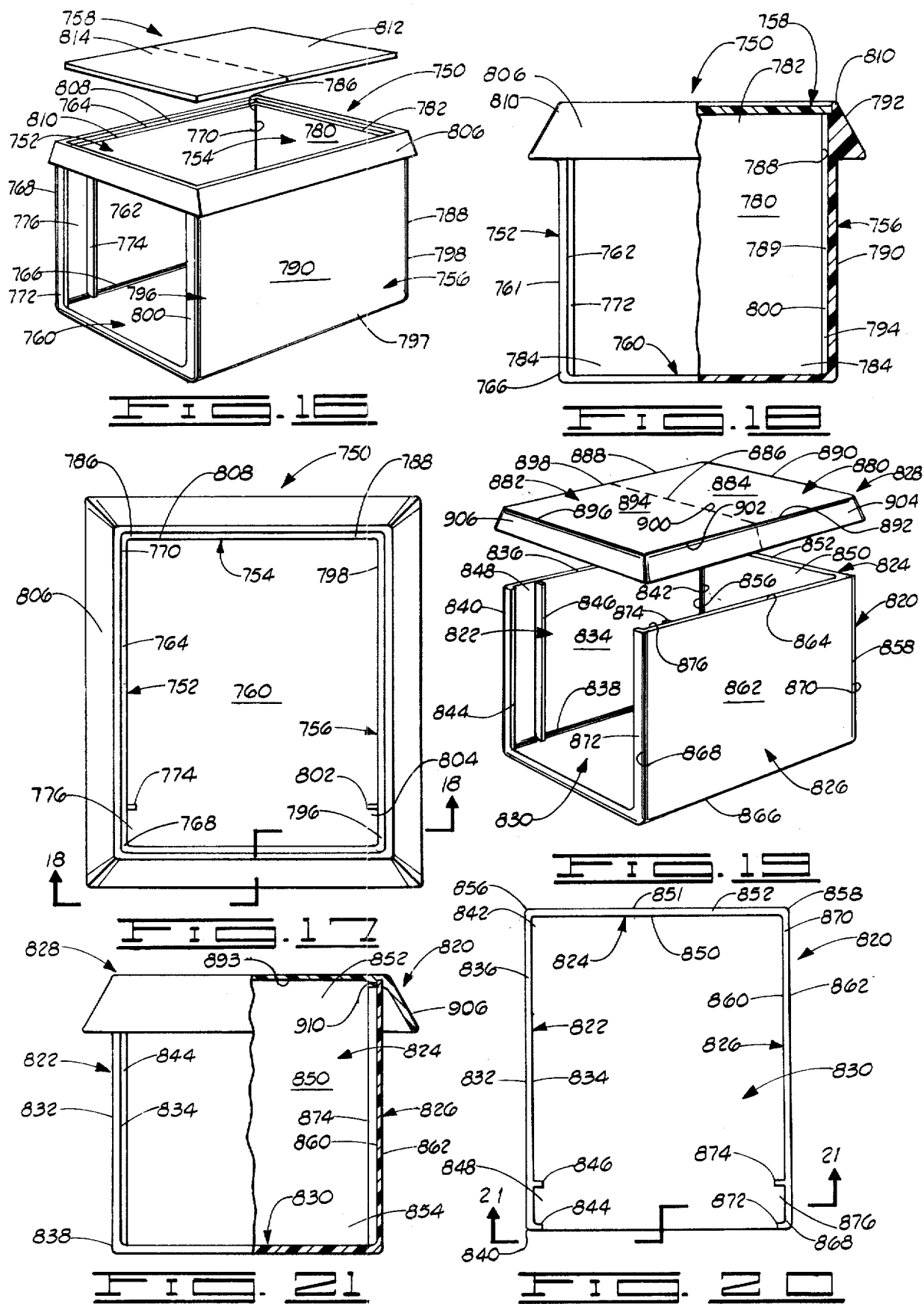

ANIMAL SHELTER AND FEED DISPENSER

BACKGROUND OF THE INVENTION

1. Field of the Invention

The present invention relates generally to the field of animal shelters, and more particularly but not by way of limitation, to an improved animal shelter for household pets, such as dogs and cats, wherein the shelter includes a feed dispenser.

In one aspect the present invention relates to a feed dispenser for an animal shelter wherein a supply of feed and water can be stored in the feed dispenser while enabling the animal to have access to the food and water stored therein.

In yet another aspect the present invention relates to a feed dispenser forming the front wall of an animal shelter, the feed dispenser being readily removable for cleaning.

2. Brief Statement of Prior Art

Animal owners, such as dog and cat owners, are generally required to feed and water their animals on a daily basis in order to maintain the health of the animal. However, in today's rapid pace the average person can omit the desired daily feeding and watering of the animal.

In addition, due to the transitory nature of today's world, animal owners often travel with their animals. In such instances problems are often encountered in maintaining a proper supply of food and water, as well as providing shelter, for the animal during travel. For example, the animal's feed and water are often spilled resulting in a substantial waste, while at the same time resulting in the undesirable spillage of the feed and water. Because of the inherent problem of spillage of the feed and water during travel, animals are many times not provided with the desired amount of feed and water during such travel.

While a need for providing the animal with a sufficient supply of feed and water at all times, and providing a shelter for the animal, even during travel, has long been recognized, such devices have heretofore been lacking. Thus, a need has long existed for an improved animal shelter having a feed dispenser which could enable the owner of the animal to store a supply of feed and water in the feed dispenser so that the feed and water would be available to the animal at all times.

SUMMARY OF THE INVENTION

According to the present invention a feed dispenser for an animal shelter is provided wherein the feed dispenser is positionable on a side wall of the shelter. The feed dispenser comprises a body member and a trough assembly. The body member is provided with an upper end and a lower end, and the body member is further characterized as having a cavity formed therein which extends from the upper end of the body member to the lower end thereof. The feed trough assembly is disposed adjacent the lower end of the body member such that the feed trough assembly extends from the body member in a direction substantially perpendicular to the body member. The feed trough assembly is provided with a feed receiving space formed therein, the feed receiving space of the feed trough assembly openly communicating with the cavity of the body member such that feed stored therein can be delivered to the feed receiving space of the trough assembly for consumption by the animal.

Further according to the invention an improved animal shelter is provided wherein the feed dispenser forms one of the side walls of the animal shelter, and the feed dispenser is provided with an opening of a sufficient size to enable the animal to pass therethrough so that the animal can enter and exit the animal shelter.

An object of the present invention is to provide an improved feed dispenser for animals, such as dogs and cats, which will eliminate the daily feeding and watering chores of the animal owner while insuring that the animal has a sufficient amount of feed and water.

Another object of the present invention is to provide an improved animal shelter having the feed dispenser wherein such shelter can be utilized on a daily basis while at the same time, allowing the owner of the animal to employ the animal shelter during travel with the animal.

Another object of the present invention is to provide an improved animal shelter and feed dispenser which can readily be cleaned by the owner to insure that same is maintained in a sanitary condition and to eliminate an odor buildup in either the animal shelter or the feed dispenser.

These and other objects, advantages, and features of the present invention will become apparent to those skilled in the art from a reading of the following detailed description when read in conjunction with the accompanied drawings which illustrate the invention.

BRIEF DESCRIPTION OF THE DRAWINGS

FIG. 1 is a perspective view of an improved animal shelter of the present invention in which a feed dispenser forms the front wall of the animal shelter.

FIG. 2 is a top plan view of the feed dispenser forming the front wall of the improved animal shelter of FIG. 1.

FIG. 3 is a partially broken, perspective view of the roof of the animal shelter of FIG. 1 illustrating a rim member for stabilizing a bowl on the roof of the animal shelter.

FIG. 4 is a partially broken, perspective view of the roof of the animal shelter of FIG. 1 illustrating a recessed portion in the roof for receiving and stabilizing the bowl on the roof of the animal shelter.

FIG. 5 is a perspective view of the feed dispenser.

FIG. 6 is an enlarged, partially broken perspective view of one of the side walls of the animal shelter of FIG. 1 illustrating a plurality of flanges for receiving and securing the feed dispenser.

FIG. 7 is an enlarged, partially cutaway, front view of the feed dispenser of FIG. 5 illustrating a water dispensing unit positioned therein.

FIG. 8 is a perspective view of the water dispensing unit of FIG. 7.

FIG. 9 is an enlarged, cross-sectional view illustrating the water dispensing valve of the water dispensing unit of FIG. 8.

FIG. 10 is an exploded perspective view of the improved animal shelter of the present invention wherein the feed dispenser forms the front wall of the shelter.

FIG. 12 is a perspective view of the feed dispenser of FIG. 11 having the water dispensing unit disposed therein.

FIG. 13 is an enlarged, side view of a clip assembly for securing the side walls and the feed dispenser of the animal shelter of FIG. 11 to a lower support floor member.

FIG. 14 is a plan view depicting the lower side of the roof of the animal feed shelter of FIG. 11.

FIG. 15 is a perspective view of another embodiment of the floor support structure of the animal shelter of FIG. 11.

FIG. 16 is a partially exploded, perspective view of another embodiment of the animal shelter of the present invention wherein the feed dispenser forming the front wall has been removed.

FIG. 17 is a top view of the animal shelter of FIG. 16 having the roof removed therefrom.

FIG. 18 is a partial, cross-sectional view of the animal shelter of FIG. 17 taken along the lines 18—18.

FIG. 19 is a partially exploded, perspective view of another embodiment of the animal shelter of the present invention wherein the feed dispenser forming the front wall thereof has been removed.

FIG. 20 is a top plan view of the animal shelter of FIG. 19 having the roof removed therefrom.

FIG. 21 is a front plan view, in partial cross section, of the animal shelter of FIG. 20 taken along the lines 21—21.

DETAILED DESCRIPTION OF THE DRAWINGS

Figure 11:
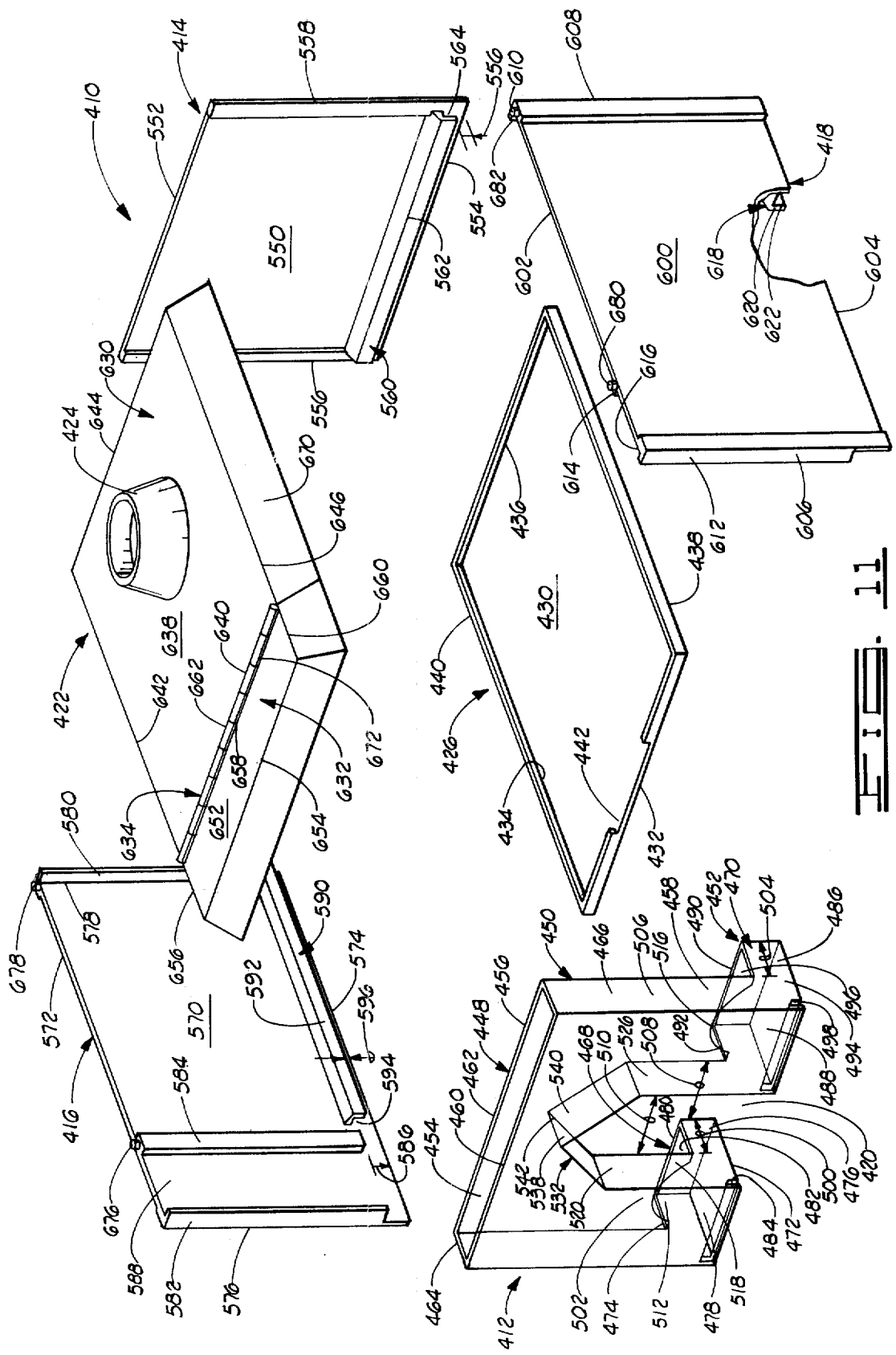
FIG. 11 is an exploded perspective view of another embodiment of the animal shelter of the present invention wherein the feed dispenser forms the front wall of the animal shelter.

Referring to the drawings in general, and more particularly to FIG. 1, shown therein and designated by the general reference numeral 10 is an improved animal shelter constructed in accordance with the present invention. The animal shelter 10, depicted as a rectangular-shaped member, is provided with a front wall 12, a parallel, spatially disposed rear wall 14, a first side wall 16, and a parallel, spatially disposed second side wall 18. The front wall 12 is provided with an opening 20 therein, the opening 20 being of a sufficient size to allow an animal, such as a dog or cat, to pass therethrough for entry into or exit from the animal shelter 10. The animal shelter 10 is further provided with a roof 22 disposed on and supported by the before-mentioned walls, a bowl 24 positionable on the roof 22, and a floor or lower support member 26. The bowl 24 provides the animal shelter 10 with the appearance of having a chimney.

Referring now to FIGS. 1, 2, 5 and 7, a feed dispenser 28 is shown as forming the front wall 12 of the animal shelter 10. The feed dispenser 28 comprises a body member 30 and a trough assembly 32. The body member 30, depicted as a substantially rectangular-shaped member, is provided with a cavity 34 which extends between an upper end 36 and a lower end 38 of the body member 30. The body member 30 thus comprises a first side wall 40, a spatially disposed second side wall 42, a first end wall 44, and a spatially disposed second end wall 46, each of which are joined together to provide the body member 30 with the rectangular-shaped configuration and form the cavity 34 therein.

The trough assembly 32 of the feed dispenser 28 is disposed adjacent the lower end 38 of the body member 30 such that the trough assembly 32 openly communicates with the cavity 34 formed in the body member 30 and extends from the body member 30 in a direction substantially perpendicular to the body member 30 as shown in FIGS. 2 and 5. The trough assembly 32 desirably comprises a first trough 48 and a second trough 50.

The first trough 48 comprises a lower side 52, a first side wall 54, a parallel, spatially disposed second side wall 56, a first end wall 58, and a parallel, spatially disposed second end wall 60. Each of the before-mentioned walls 54, 56, 58 and 60 of the first trough 48 are connected to a peripheral edge portion of the lower side 52 of the trough 48 such that the side walls 54, 56, 58 and 60 extend in a common direction and are disposed substantially perpendicular to the plane of the lower side 52. The end portions of each of the walls 54, 56, 58 and 60 abut and are connected to an end portion of the adjacently disposed wall. Thus, the first trough 48 is provided with a rectangular-shaped, box-like configuration having a space 62 formed therein.

The second trough 50 comprises a lower side 64, a first side wall 66, a parallel, spatially disposed second side wall 68, a first end wall 70, and a parallel, spatially disposed second end wall 72. Each of the before-mentioned walls 66, 68, 70 and 72 of the second trough 50 are connected to a peripheral edge portion of the lower side 64 of the second trough 50 such that the side walls 66, 68, 70 and 72 extend in a common direction and are disposed substantially perpendicular to the plane of the lower side 64. The end portions of each of the walls 66, 68, 70 and 72 abut and are connected to an end portion of the adjacently disposed walls. Thus, the first trough 48 is provided with a rectangular shaped, box-like configuration having a space 74 formed therein.

The first trough 48 of the trough assembly 32 is disposed adjacent the lower end 38 of the body member 30 such that the first end wall 58 of the first trough 48 is substantially aligned and coplanar with the first side wall 40 of the body member 30; the second end wall 60 of the first trough 48 is disposed a distance 76 from the second side wall 42 of the body member 30; the first side wall 54 of the first trough 48 is aligned with and coplanar with the first end wall 44 of the body member 30; and the second side wall 56 of the first trough 48 is aligned with the portion of the body member 30 nearest the first end wall 44 of the body member 30 defining the opening 20 therein. Thus, the space 62 in the first trough 48 is in open communication with a first portion 78 of the cavity 34 formed in the body member 30 of the feed dispenser 28.

The second trough 50 of the trough assembly 32 is disposed adjacent the lower end 38 of the body member 30 such that the first end wall 70 of the second trough 50 is substantially aligned with and coplanar the first side wall 40 of the body member 30; the second end wall 72 of the second trough 50 is disposed a distance 80 from the second side wall 42 of the body member 30; the second side wall 68 of the second trough 50 is aligned with and coplanar the second end wall 46 of the body member 30; and the first side wall 66 of the second trough 50 is aligned with the portion of the body member 30 nearest the second end wall 46 of the body member 30 defining the opening 20 therein. Thus, the space 74 in the second trough 50 is in open communication with a second portion 82 of the cavity 34 formed in the body member 30 of the feed dispenser 28.

By disposing the first and second troughs 48, 50 of the trough assembly 32 adjacent the lower end 38 of the body member 30 as described above the first and second troughs 48, 50 are disposed in a parallel relationship with each other a distance 84 apart, the distance 84 corresponding to a width 86 of the opening 20 in the body member 30. The unique construction and inner relationship between the body member 30 and the first and second troughs 48, 50 of the trough assembly 32, in combination with the open communication of each of the first and second troughs 48, 50 with the first and second portions 78, 82, respectively, of the cavity 34 formed in the body member 30 enables one to dispense a quantity of food into the cavity 34 of the body member 30 of the feed dispenser 28 so that a quantity of food will continuously be delivered to at least one of the first and second troughs 48, 50 of the trough assembly 32.

In order to allow the animal to more readily obtain the feed from either or both of the first and second troughs 48, 50, and to prevent plugging of the first and second portions 78, 82 of the cavity 34 in the body member 30, an arcuate shaped opening 88 is provided in a lower edge portion 90 of the second side wall 42 of the body member 30, the arcuate shaped opening 88 being disposed above the first trough 48 and extending across the space 62 formed in the first trough 48. Similarly, an arcuate shaped opening 92 is provided in a lower edge portion 94 of the second side wall 42 of the body member 30, the arcuate shaped opening 92 being disposed above the second trough 50 and extending across the space 74 formed in the second trough 50.

When employing the feed dispenser 20 as the front wall 12 of the animal shelter 10, and the front wall 12 is to be provided with the opening 20 therein to enable the animal to enter and exit the shelter 10, the opening 20 is formed through the body member 30 of the feed dispenser 28 (via the first and second side walls 40, 42 of the body member 30) at a position between the first and second troughs 48, 50 of the trough assembly 32. The opening 20 thus divides the lower portion of the cavity 34 in the body member 30 into the before-mentioned first portion 78 (which openly communicates with the space 62 formed in the first trough 48) and the second portion 82 (which openly communicates with the space 74 formed in the second trough 50).

In order to define the opening 20 formed through the body member 30 of the feed dispenser 28, (such opening 20 being formed by the body member 30 and the first and second troughs 48, 50), and to prevent the undesired discharge of material from the cavity 34 of the body member 30 via the opening 20 in the body member 30, a first side partition 96 is disposed between and interconnects the first and second side walls 40, 42 of the body member 30 defining one side of the opening 20. A second side partition 102 is disposed between and interconnects the first and second side walls 40, 42 of the body member 30 forming the opposed second side of the opening 20. An upper partition 108 is disposed between and interconnects the first and second side walls 40, 42 of the body member 30 forming the upper side of the opening 20. One end of the upper partition 108 is supported by and secured to an upper end of the first side partition 96 and the other end of the upper partition 108 is supported by and secured to an upper end of the second side partition 102. Thus, the first side partition 96, the second side partition 102, and the upper partition 108, in cooperation with in the first and second walls 40, 42 of the body member 30 and second end walls 44, 46 of the body member 30 seal the cavity 34 in the body member 30 around the opening 20.

The upper partition 108 described above is desirably formed of two angularly-disposed members 116, 118 as shown in FIGS. 1, 5 and 7. When employing the two angularly-disposed members 116, 118 as the upper partition 108 one of the angularly-disposed members, such as the member 116, is connected along one end to the upper end of the first side partition 96, the other of the angularly-disposed members, such as the member 118, is connected along one end to the upper end of the second side partition 102, and the other ends of the two angularly-disposed members 116, 118 are joined together to form a ridge 120 substantially as shown in the drawing.

When employing the angularly-disposed members 116, 118 as the upper partition 108 one of the members 116, 118 can be employed as a support for a water dispensing assembly 122 as will be described hereinafter. Further, the angularly-disposed members 116, 118 function as funneling surfaces for directing feed disposed within the cavity 34 of the body member 30 into one or both of the first and second portions 78, 82 of the cavity 34 and thus into one or both of the first and second troughs 48, 50 of the trough assembly 32.

Referring now to FIG. 10 an embodiment of the animal shelter 10 is illustrated wherein the feed dispenser 28 is employed as the front wall 12 of the animal shelter 10, and the rear wall 14, the first side wall 16, the second side wall 18, the roof 22, and the floor 26 of the animal shelter 10 are formed of separate elements so that one can, when desired, disassemble the animal shelter 10 for storage or for cleaning of same. The floor 26 is illustrated as a substantially rectangular-shaped member having a first side 130, an opposed second side (not shown), a forward end 132, a first end 134, a rearward end 136, and a second end 138. A ridge 140 is formed along the periphery of the first side 130 of the floor 26 along the first end 134, the rearward end 136, and the second end 138.

The ridge 140, which is perpendicularly disposed with respect to the plane of the floor 26, is provided with a channel on groove 142 which extends along the ridge 140 substantially as shown. The channel or groove 142 in the portion of the ridge 140 disposed along the rearward end 136 of the first side 130 of the floor 26 is adapted to receive a lower end 144 of the rear wall 14; the channel or groove 142 in the portion of the ridge 140 disposed along first end 134 of the first side 130 of the floor 26 is adapted to receive a lower end 146 of the first side wall 16; and the channel or groove 142 in the portion of the ridge 140 disposed along the second end 138 of the first side 130 of the floor 26 is adapted to receive a lower end 148 of the second side wall 18 when same are in the assembled position.

A second ridge 150 having a first end 152 and an opposed second end 154 is formed along a portion of the forward end 132 of the first side 130 of the floor 26; and a third ridge 156 having a first end 158 and an opposed second end 160 is formed along a portion of the forward end 132 of the first side 130 of the floor 26 such that the second and third ridges 150, 156 are aligned and in a spaced apart relationship.

A first beam 170 having a first end 172 and a second end 174 is formed on the first side 130 of the floor 26. The first end 172 of the first beam 170 abuts the second end 154 of the second ridge 150 and the elongated axis of the first beam 170 is substantially perpendicular to the elongated axis of the second ridge 150. A second beam 176 having a first end 178 and a second end 180 is also formed on the first side 130 of the floor 26. The second beam 170 is disposed in a parallel spatial relationship with the second ridge 150 such that the second end 180 of the second beam 176 abuts the second end 174 of the first beam 170 and the first end 178 of the second beam 176 abuts the portion of the first ridge 140 which is disposed along the first end 134 of the first side 130 of the floor 26. The interconnection of the first ridge 140, the second ridge 150, the first beam 170, and the second beam 176, as described above and as shown in the drawing, provides a confined area 182 on the first side 130 of the floor 26 into which the the first trough 48 of the trough assembly 32 of the feed dispenser 28 can be positioned to stabilizing the feed dispenser 28 when the animal shelter 10 is in the assembled position and the feed dispenser 28 is employed as the front wall 12 of the animal shelter 10.

In order to further stabilize the feed dispenser 28 when the animal shelter is in the assembled position and the feed dispenser 28 is employed as the front wall 12, a third beam 190 having a first end 192 and a second end 194 is formed on the first side 130 of the floor 26 such that the first end 192 of the third beam 190 abuts the first end 158 of the third ridge 156 and the elongated axis of the third beam 190 is substantially perpendicular to the elongated axis of the third ridge 156. A fourth beam 196 having a first end 198 and a second end 200 is also formed on the first side 130 of the floor 26. The fourth beam 196 is disposed in a parallel, spatial relationship with the third ridge 156 such that the first end 198 of the fourth beam 196 abuts the second end 194 of the third beam 190, and the second end 200 of the fourth beam 196 abuts the portion of the first ridge 140 disposed along the second end 138 of the first side 130 of the floor 26. The interconnection of the first ridge 140, the third ridge 156, the third beam 190, and the fourth beam 196, as described above and as shown in the drawing, provides a confined area 202 on the first side 130 of the floor 26 into which the second trough 50 of the trough assembly 32 of the feed dispenser 28 can be positioned to stabilize the feed dispenser 28 when the animal shelter 10 is in the assembled position and the feed dispenser 28 is employed as the front wall 12 of the animal feed shelter 10.

The rear wall 14 of the animal shelter 10 is a substantially rectangular-shaped member having a first side 210, a second side (not shown), an upper end 212, the lower end 144, a first end 216, and a second end 218. A pair of spatially disposed flanges 220, 222 are formed on the first end 216 of the rear wall 14 such that the flanges 220, 222 extend from the first side 210 of the rear wall 14 in a direction substantially perpendicular to the plane of the rear wall 14. The spatially disposed flanges 220, 222 extend from the upper end 212 of the rear wall 14 along the first side 210 in the direction of the lower end 144 of the rear wall 14, the flanges 220, 222 terminating a distance 226 from the lower end 144 of the rear wall 14 corresponding substantially to the depth of the channel or groove 142 formed in the ridge 140 extending along the rearward end 136 of the first side 130 of the floor 26. The spartially disposed flanges 220, 222, and the portion of the rear wall 14 disposed therebetween, cooperate to form a channel or groove 228. The channel or groove 228 so formed is of a sufficient width and depth to receive an end portion of the first side wall 16 as will be described in more detail hereinafter.

A second pair of spatially disposed flanges 232, 234 are formed on the second end 218 of the rear wall 14 such that the flanges 232, 234 extend from the first side 210 of the rear wall 14 in a direction substantially perpendicular to the plane of the rear wall 14. The spatially disposed flanges 232, 234 extend from the upper end 212 of the rear wall 14 along the first side 210 in the direction of the lower end 144 of the rear wall 14, the flanges 232, 234 terminating a distance 236 from the lower end 144 of the rear wall 14 corresponding substantially to the depth of the channel or groove 142 formed in the ridge 140 extending along the rearward end 136 of the first side 130 of the floor 26. The spatially disposed flanges 232, 234, and the portion of the rear wall 14 disposed therebetween, cooperate to form a channel or groove 238. The channel or groove 238 so formed is of a sufficient width and depth to receive an end portion of the second side wall 18 as will be described in more detail hereinafter.

The first side wall 16 of the animal shelter 10 is a substantially rectangular-shaped member having a first side (not shown), a second side 250, an upper end 252, the lower end 146, a first end 256, and a second end 258. A pair of spatially disposed flanges 260, 262 are formed on the first end 256 of the first side wall 16 such that the flanges 260, 262 extend from the second side 250 of the first side wall 16 in a direction substantially perpendicular to the plane of the first side wall 16. The spatially disposed flanges 260, 262 extend from the upper end 252 of the first side wall 16 along the second side 250 thereof in the direction of the lower end 146 of the first side wall 16, the flanges 260, 262 terminating a distance 264 from the lower end 146 of the first side wall 262 corresponding substantially to the depth of the channel or groove 142 formed in the ridge 140 extending along the first end 134 of the first side 130 of the floor 26. As more clearly shown in FIG. 6, the spatially disposed flanges 260, 262, and the portion of the second side 250 of the first side wall 16 disposed therebetween, cooperate to form a channel or groove 266. The channel or groove 266 so formed is of a sufficient width and depth to receive a portion of the body member 30 and the first trough 48 of the feed dispenser 28 when the animal shelter 10 is in the assembled position.

The second side wall 18 of the animal shelter 10 is a substantially rectangular-shaped member having a first side (not shown), a second side 270, an upper end 272, the lower end 148, a first end 276, and a second end 278. A pair of spatially disposed flanges 280, 282 are formed on the first end 276 of the second side wall 18 such that the flanges 280, 282 extend from the first side (not shown) of the second side wall 18 in a direction substantially perpendicular to the plane of the second side wall 18. The spatially disposed flanges 280, 282 are identical in construction to the flanges 260, 262 on the second side 250 of the first side wall 16 as hereinbefore described. Thus, the flanges 280, 282 extend from the upper end 272 of the second side wall 18 along the first side (not shown) thereof in the direction of the lower end 148 of the second side wall 18, the flanges 280, 282 terminating a distance 283 from the lower end 148 of the first side wall substantially corresponding to the depth of the channel or groove formed in the ridge 140 extending along the second side edge portion 138 of the first side 130 of the floor 26.

The spatially disposed flanges 280, 282 and the portion of the first side (not shown) of the second side wall 18 disposed therebetween cooperate to form a channel or groove 284. The channel or groove 284 so formed is of a sufficient width and depth to receive a portion of the body member 30 and the second trough 50 of the feed dispenser 28 when the animal shelter 10 is in the assembled position.

To assemble the animal shelter 10 the lower end 144 of the rear wall 14 is positioned in the groove 142 in the portion of the ridge 140 disposed along the rearward end 136 of the first side 130 of the floor 26 such that the channel or groove 228 formed on the first end 216 of the rear wall 14 is aligned with the groove 142 in the portion of the ridge 140 disposed along the first end 134 of the floor 26, and the channel or groove 238 formed on the second end 218 of the rear wall 14 is aligned with the groove 142 in the portion of the ridge 140 disposed along the second end 138 of the floor 26. The second end 258 of the first side wall 16 is positioned in the channel or groove 228 on the first end 216 of the rear wall 14 such that the lower end 146 of the first side wall 16 is aligned with and positioned in the portion of the channel or groove 142 of the ridge 140 disposed on the first end 134 of the first side 130 of the floor 26. The second end 278 of the second side wall 18 is then positioned in the channel or groove 228 on the second end 218 of the rear wall 14 such that the lower end 148 of the second side wall 18 is aligned with and positioned in the portion of the channel or groove 142 of the ridge 140 disposed on the second end 138 of the first side 130 of the floor 26.

The rear wall 14 and the first and second side wall 16, 18, are constructed such that, in an assembled position with the floor 26 as described above, the upper end 212 of the rear wall 14 and the upper ends 252, 272 of the first and second side walls 16, 18, respectively, are substantially coplanar. Further, the length of the first and second side walls 16, 18 is such that the channel 266 formed on the first end 256 of the first side wall 16 is disposed substantially adjacent the confined area 182 formed on the first side 130 of the floor 26; and the channel 284 formed on the first end 276 of the second side wall 18 is disposed substantially adjacent the confined area 202 formed on the first side 130 of the floor 26.

The feed dispenser 28, i.e., the front wall 14, can then be slideably positioned in the channels 266, 284 of the first and second side walls 16, 18, respectively. To further stabilize the feed dispenser 28 the first trough 48 of the feed dispenser 28 is positioned in the confined area 182 on the first side 130 of the floor 26, and the second trough 50 of the feed dispenser 28 is positioned in the confined area 202 on the first side 130 of the floor 26. Preferably the feed dispenser 28 is constructed such that, in the assembled position of the animal shelter 10, the upper end 36 of the body member 30 of the feed dispenser 28 is substantially coplanar with the upper end 212 of the rear wall 14 and the upper ends 252, 272 of the first and second side walls 16, 18, respectively.

As previously stated, the roof 22 of the animal shelter 10 is positioned upon and supported by the feed dispenser 28 (when same is employed as the front wall 12 of the animal shelter 10), the rear wall 14, the first side wall 16, and the second side wall 18 when same are in the assembled position. The roof 22 can be fabricated as a unitary member or from a plurality of members which are pivotally connected together.

Referring specifically to FIGS. 1 and 10, the roof 22 of the animal shelter 10 comprises a first or rearwardly disposed member 300, a second or forwardly disposed member 302 and a hinge assembly 304 for pivotally connecting the first member 300 to the second member 302. The first member 300, a generally rectangularly-shaped member, is provided with a lower side (not shown), an upper side 306, a forward end 308, a first end 310, a rearward end 312, and a second end 314. The first member 300 is fabricated such that the rearward end 312 is positionable upon and supported by the upper end 212 of the rear wall 14, the first end 310 of the first member 300 is positionable upon and supported by a portion of the upper end 252 of the first side wall 16, and the second end 314 of the first member 300 is positionable upon and supported by the upper end 272 of the second wall 18 of the animal shelter 10. The forward end 308 of the first member 300 terminates a distance 316 from the first ends 256, 276 of the first and second side walls 16, 18 of the animal shelter, the distance 316 substantially corresponding to the width of the channels 266, 284 formed on the first ends 256 and 276 of the first and second side walls 16, 18, respectively, such that the feed dispenser 28 can be slidably disposed in the channels 266, 284 as hereinbefore described.

The second or forwardly disposed member 302 of the roof 22, a generally rectangular-shaped member, is provided with a lower side (not shown), an upper side 318, a forward end 320, a first end 322, a rearward end 324, and a second end 326. The second member 302 of the roof 22 is fabricated such that the rearward end 324 can be disposed substantially adjacent the forward end 308 of the first member 300 of the roof 22, the first and second ends 322, 326 of the second member 302 are positionable upon and supported by a forward portions of the upper ends 252, 272 of the first and second side walls 16, 18, respectively, and the forward end 320 of the second member 302 is positionable upon and supported by the upper end 36 of the body member 30 of the feed dispenser 28.

The first and second members 300, 302 of the roof 22 are pivotally connected via their respective forward end 308 and rearward end 324 by the hinge assembly 304. Any suitable hinge assembly can be employed, such as a piano hinge depicted in FIGS. 1 and 10, or a pair of hinges as depicted in FIG. 11. It should be noted that by pivotally connecting the first member 300 to the second member 302 with the hinge assembly 304 as hereinbefore described, the second member 302 can be pivoted in an upward direction to allow one to have ready access to the feed dispenser 28 forming the front wall 12 of the animal shelter 10, either for the purpose of dispensing feed or water into the feed dispenser 28 of the animal shelter 10, or for removing the feed dispenser 28 or cleaning of same.

The roof 22 further comprises a first angularly-disposed member 328 and a second angularly-disposed member 330 which cooperate with the first and second members 300, 302 of the roof 22 to provide the roof 22 with an overhang. The first angularly-disposed member 328 is positioned on the first member 300 around the first end 310, the rearward end 312, and the second end 314 such that the first angularly-disposed member 328 depends from the first member 300 in a downwardly direction and is angularly disposed in a direction away from the rear wall 14, the first side wall 16, and the second side wall 18 of the animal shelter 10 as shown.

The second angularly-disposed member 330 is positioned around the forward end 320, the first end 322, and the second end 326 of the second member 302 of the roof 22 such that the second angularly-disposed member 330 depends from the second member 302 in a downwardly direction and is angularly-disposed in a direction away from the front wall 12, the first side wall 16, and the second side wall 18 of the animal shelter 10. The first and second angularly-disposed members 328, 330 are formed so that when the first and second members 300, 302 of the roof 22 are in the normal position, as depicted in FIGS. 1 and 10, the adjacent portions of the first angularly-disposed member 328 and the second angularly-disposed member 330 are coplanar.

The roof 22 constructed from the first and second members 300, 302 as described above can readily be positioned upon and supported by the upper end 36 of the body member 30 of the feed dispenser 28 (i.e., the front wall 12 of the animal shelter 10), the upper end 212 of the rear wall 14, and the upper ends 252, 272 of the first and second side walls 16, 18, respectively via the lower sides (not shown) of the first and second members 300, 302 of the roof 22 when same are in the assembled position and interconnected via the hinge assembly 304.

In order to provide the animal shelter 10 with a more realistic appearance, the bowl 24 is disposed upon the upper side 306 of the first member 300 of the roof 22. The bowl 24 can be utilized to provide a source of water for the animal, or as a source for supplying treats and the like to the animal.

Referring now to FIG. 3 a portion of the first or rearwardly disposed member 300 of the roof 22 is illustrated. A rim 340 is disposed on the upper side 306 of the first member 300, the rim 340 adapted to receive a portion of the bowl 24 for stabilizing the bowl 24 on the roof 22.

Referring to FIG. 4, a portion of the first or rearwardly disposed member 300 of the roof 22 is illustrated. A recessed portion 342 is formed in the upper side 306 of the first member 300, the recessed portion 342 being adapted to receive a lower portion of the bowl 24 therein for stabilizing the bowl 24 on the roof 22.

As previously stated, the use of the angularly-disposed members 116, 118 to enclose the upper portion of the opening 20 in the body member 30 function as funneling surfaces for directing feed disposed within the cavity 34 into one or both of the first and second portions 78, 82 of the cavity 34 and thus into one or both of the first and second troughs 48, 50 of the trough assembly 32. Further, the angularly-disposed members 116, 118 can be employed to support the water dispensing assembly 122 when it is determined desirable to position the water dispensing assembly 122 in the body member 30 of the feed dispenser 28 so that the animal can have access to water via the water dispensing assembly 128, one of the first or second portions 78, 82 of the cavity 34, and the adjacently disposed first or second troughs 48, 50 of the trough assembly 32.

Referring now to FIG. 7, the relationship between the water dispensing assembly 122 and the feed dispenser 28 is illustrated. The water dispensing assembly 122 is disposed within the cavity 34 of the body member 30 such that the water dispensing assembly 122 openly communicates with the space 74 in the second trough 50 via the second portion 82 of the cavity 34 in the body member 50. It should be noted that the angularly-disposed member 118 employed to enclose the upper portion of the opening 20 in the body member 30, in cooperation with the first side wall 40, the second side wall 42 and the second end wall 46 of the body member 30 serves as a support for securing the water dispensing assembly 122 in a stable position within the cavity 34.

Referring now to FIGS. 8 and 9, in combination with FIG. 7, the water dispensing assembly 122 comprises a body member 350 having a cavity 352 formed therein for maintaining a supply of water within the body member 350, and a valve assembly 354 communicating with the cavity 352 formed in the body member 350 such that upon activation of the valve assembly 354 water can be supplied from the cavity 352 of the body member 350 to the animal or the second trough 50 via the valve assembly 354. The body member 350 is desirably provided with an open upper end 356 which facilitates the filling of the cavity 352 of the body member 350 with water.

The body member 350 of the water dispensing assembly 122 comprises a first side wall 360, a spatially disposed second side wall 362, a first angularly-shaped end wall 364, a spatially disposed second end wall 366, and a lower or bottom wall 368. Each of the first side wall 360, the second side wall 362, the angularly-shaped first end wall 364 and the second end wall 366 are joined to the lower or bottom wall 368; the angularly-shaped first end wall is disposed between and joined to one end of the first and second side walls 360, 362; and the second end wall 366 is disposed between and joined to the opposite end of the first and second side walls 360, 362 such that the water dispensing assembly 122 is provided with a configuration substantially as shown in FIG. 8. The bottom or lower wall 368 of the body member 350 of the water dispensing assembly 122 is provided with an aperture 370 therein, the aperture 370 communicating with the valve assembly 354 such that a controlled amount of water can be delivered to the animal or the second trough 50 from the cavity 352 in the body member 350 of the water dispensing assembly 122 via the aperture 370 and the valve assembly 354.

Any suitable valve can be employed as the valve assembly 354 of the water dispensing assembly 122. However, it is preferred that the valve assembly 354 be a pressure actuated assembly which the animal can activate to obtain the water from the cavity 352 in the body member 350 of the water dispensing assembly 122. Such pressure actuated valves for dispensing water to the animal are well known in the art and thus no further comments are believed necessary. However, FIG. 9 is an enlarged cross-sectional view showing the inner relationship of the valve assembly 354 within the aperture 370 formed in the bottom or lower side 368 of the body member 350 of the water dispensing assembly 122 so that the valve assembly 354 fluidly communicates with the cavity 352 formed in the body member 350.

Referring now to FIG. 11, shown therein and designated by the general reference numeral 410 is a second embodiment of an improved animal shelter constructed in accordance with the present invention. The animal shelter 410, depicted as a rectangular-shaped member, is provided with a front wall 412, a parallel, spatially disposed rear wall 414, a first side wall 416, and a parallel, spatially disposed second side wall 418. The front wall 412 is provided with an opening 420 therein, the opening 420 being of a sufficient size to allow an animal, such as a dog or cat, to pass therethrough for entry into or exit from the animal shelter 410. The animal shelter 410 is further provided with a roof 422 disposed on and supported by the before-mentioned walls, a bowl 424 positionable on the roof 422, and a floor or lower support member 426. The bowl 424 provides the animal shelter 410 with the appearance of having a chimney.

The floor 426 of the animal shelter 410 is illustrated as a substantially rectangular-shaped member having a first or upper side 430, an opposed second side (not shown), a forward end 432, a first end 434, a rearward end 436, and a second end 438. A ridge 440 is formed along the periphery of the first side 430 of the floor 426, the ridge 440 being disposed substantially perpendicular to the plane of the first side 430 of the floor 426 substantially as shown. An opening 424 is provided in the portion of the ridge 440 disposed along the forward end 432 of the first side 430 of the floor 26, the opening 442 in the ridge 440 having a width substantially corresponding to the width of the opening 420 formed in the front wall 412 of the animal shelter 410.

Referring now to FIGS. 11 and 12, a feed dispenser 448 is shown as forming the front wall 412 of the animal shelter 410. The feed dispenser 448 comprises a body member 450 and a trough assembly 452. The body member 450, depicted as a substantially rectangular-shaped member, is provided with a cavity 454 which extends between an upper end 456 and a lower end 458 of the body member 450. The body member 450 comprises a first side wall 460, a spatially disposed second side wall 462, a first end wall 464, and a spatially disposed second end wall 466, each of which are joined together to provide the body member 450 with the rectangular-shaped configuration and form the cavity 454 therein.

The trough assembly 452 of the feed dispenser 448 is disposed adjacent the lower end 458 of the body member 450 such that the trough assembly 452 openly communicates with the cavity 454 formed in the body member 450 and extends from the body member 450 in a direction substantially perpendicular to the body member 450 as shown. The trough assembly 452 desirably comprises a first trough 468 and a second trough 470.

The first trough 468 comprises a lower side 472, a first side wall 474, a parallel, spatially disposed second side wall 476, a first end wall 478, and a parallel, spatially disposed second end wall 480. Each of the beforementioned walls 474, 476, 478 and 480 of the first trough 468 are connected to a peripheral edge portion of the lower side 472 of the trough 468 such that the walls 474, 476, 478 and 480 extend in a common direction and are disposed substantially perpendicular to the plane of the lower side 472. The end portions of each of the walls 474, 476, 478 and 480 abut and are connected to an end portion of the adjacently disposed wall. Thus, the first trough 468 is provided with a generally rectangular-shaped, box-like configuration having a space 482 formed therein.

The first trough 468 is further characterized as having a ridge engaging channel 484 formed in the lower side 472 thereof at a position in close proximity to the first side wall 474. The ridge engaging channel 484 extends the length of the first trough 468 and through the first end wall 478 and the second end wall 480 of the first trough 468. The ridge engaging channel 484 is of a sufficient width and depth to engage one portion of the ridge 440 disposed on the forward end 432 of the first side 430 of the floor 426 between the opening 442 in the ridge 440 and the first end 434 of the floor 426. Thus, the ridge engaging channel 484 and the portion of the ridge 440 disposed between the opening 442 and the first end 434 of the floor 426 cooperate to stabilize the feed dispenser 448 when same is in an assembled position with the floor 426 of the animal shelter 410.

The second trough 470 comprises a lower side 486, a first side wall 488, a parallel, spatially disposed second side wall 490, a first end wall 492 and a parallel, spatially disposed second end wall 494. Each of the before-mentioned walls 488, 490, 492 and 494 of the second trough 470 are connected to a peripheral edge portion of the lower side 486 of the second trough 470 such that the side walls 488, 490, 492 and 494 extend in a common direction and are disposed substantially perpendicular to the plane of the lower side 486. The end portions of each of the walls 488, 490, 492 and 494 abut and are connected to an end portion of the adjacently disposed walls. Thus, the second trough 470 is provided with a generally rectangular shaped, box-like configuration having a space 496 formed therein.

The second trough 470 is further characterized as having a ridge engaging channel 498 formed in the lower side 486 thereof at a position in close proximity to the first side wall 488. The ridge engaging channel 498 extends the length of the second trough 470 and through the first end wall 488 and the second end wall 494 of the second trough 470. The ridge engaging channel 498 is a sufficient width and depth to engage the other portion of the ridge 440 on the forward end 432 of the first side 430 of the floor 426 disposed between the opening 442 in the ridge 440 and the second end 438 of the floor 426. Thus, the ridge engaging channel 498 and the portion of the ridge 440 disposed between the opening 442 and the second end 438 of the floor 426 cooperate to stabilize the feed dispenser 448 when same is in an assembled position with the floor 426 of the animal shelter 410.

The first trough 468 of the trough assembly 452 is disposed adjacent the lower end 458 of the body member 450 such that the first end wall 478 of the first trough 468 is substantially aligned and coplanar with the first side wall 460 of the body member 450; the second end wall 480 of the first trough 468 is disposed a distance 500 from the second side wall 466 of the body member 450; the first side wall 474 of the first trough 468 is aligned with and coplanar with the first end wall 464 of the body member 450; and the second side wall 476 of the first trough 468 is aligned with the portion of the body member 450 nearest the first end wall 464 of the body member 450 defining the opening 420 therein. Thus, the space 482 in the first trough 468 is in open communication with a first portion 502 of the cavity 454 formed in the body member 450 of the feed dispenser 448.

The second trough 470 of the trough assembly 452 is disposed adjacent the lower end 458 of the body member 450 such that the first end wall 492 of the second trough 470 is substantially aligned with and coplanar the first side wall 460 of the body member 450; the second end wall 494 of the second trough 470 is disposed a distance 504 from the second side wall 462 of the body member 450; the second side wall 490 of the second trough 470 is aligned with and coplanar the second end wall 466 of the body member 450; and the first side wall 488 of the second trough 470 is aligned with the portion of the body member 450 nearest the second end wall 466 of the body member 460 defining the opening 420 therein. Thus, the space 498 in the second trough 470 is in open communication with a second portion 506 of the cavity 454 formed in the body member 450 of the feed dispenser 448.

By disposing the first and second troughs 468, 470 of the trough assembly 452 adjacent the lower end 458 of the body member 450 as described above the first and second troughs 468, 470 are disposed in a parallel relationship with each other a distance 508 apart, the distance 508 corresponding to a width 510 of the opening 420 in the body member 450. The unique construction and inner relationship between the body member 450 and the first and second troughs 468, 470 of the trough assembly 452, in combination with the open communication of each of the first and second troughs 468, 470 with the first and second portions 502, 506, respectively, of the cavity 454 formed in the body member 450 enables one to dispense a quantity of food into the cavity 454 of the body member 450 of the feed dispenser 448 so that a quantity of food will continuously be delivered to at least one of the first and second troughs 468, 470 of the trough assembly 452.

In order to allow the animal to more readily obtain the feed from either or both of the first and second troughs 468, 470, and to prevent plugging of the first and second portions 502, 506 of the cavity 454 in the body member 450, an arcuate shaped opening 512 is provided in a lower edge portion 514 of the second side wall 462 of the body member 450, the arcuate shaped opening 512 being disposed above the first trough 468 and extending across the space 496 formed in the first trough 468. Similarly, an arcuate shaped opening 516 is provided in a lower edge portion 518 of the second side wall 462 of the body member 450, the arcuate shaped opening 516 being disposed above the second trough 470 and extending across the space 496 formed in the second trough 470.

When employing the feed dispenser 448 as the front wall 412 of the animal shelter 410, and the front wall 412 is to be provided with the opening 420 therein to enable the animal to enter and exit the shelter 410, the opening 420 is formed through the body member 450 of the feed dispenser 448 (via the first and second side walls 460, 462 of the body member 450) at a position between the first and second troughs 468, 470 of the trough assembly 452. The opening 420 thus divides the lower portion of the cavity 454 in the body member 450 into the beforementioned first portion 502 which openly communicates with the space 482 formed in the first trough 468, and the second portion 506 which openly communicates with the space 496 formed in the second trough 470.

In order to define the opening 420 formed through the body member 450 of the feed dispenser 448, (such opening 420 being formed by the body member 450 and the first and second troughs 468, 470), and to prevent the undesired discharge of material from the cavity 454 of the body member 450 via the opening 420 in the body member 450, a first side partition 520 is disposed between and interconnects the first and second side walls 460, 462 of the body member 450 defining one side of the opening 420. A second side partition 526 is disposed between and interconnects the first and second side walls 460, 462 of the body member 450 forming the opposed second side of the opening 420. An upper partition 532 is disposed between and interconnects the first and second side walls 460, 462 of the body member 450 forming the upper side of the opening 420. One end of the upper partition 532 is supported by and secured to an upper end of the first side partition 520 and the other end of the upper partition 532 is supported by and secured to an upper end of the second side partition 526. Thus, the first side partition 520, the second side partition 526, and the upper partition 532, in cooperation within the first and second walls 460, 462 of the body member 450 and second end walls 464, 466 of the body member 450 seal the cavity 454 in the body member 450 around the opening 420.

The upper partition 532 described above is desirably formed of two angularly-disposed members 538, 540. When employing the two angularly-disposed members 538, 540 as the upper partition 532 one of the angularly-disposed members, such as the member 538, is connected along one end to the upper end of the first side partition 520, the other of the angularly-disposed members, such as the member 540, is connected along one end to the upper end of the second side partition 526, and the other ends of the two angularly-disposed members 538, 540 are joined together to form a ridge 542 substantially as shown in the drawing.

When employing the angularly-disposed members 538, 540 as the upper partition one of the members 538, 540 can be employed as a support for the water dispensing assembly 122 heretofore described with reference to FIGS. 7, 8 and 9. Further, the angularly-disposed members 538, 540 function as funneling surfaces for directing feed disposed within the cavity 454 of the body member 450 into one or both of the first and second portions 502, 506 of the first and second portions 502, 506 of the cavity 454 and thus into one or both of the first and second troughs 468, 470 of the trough assembly 452.

As shown in FIG. 11, the rear wall 414 of the animal shelter 410 is a substantially rectangular-shaped member having a first side 550, a second side (not shown), an upper end 552, a lower end 554, a first end 556, and a second end 558. A clip assembly 560 is disposed on the first side 550 of the rear wall 414, the clip assembly 560 being adapted to engage the portion of the ridge 440 disposed along the rearward end 436 of the floor 426 so that the rear wall 414 can be secured to the rearward end 430 of the floor 426.

As more clearly shown in FIG. 13, the clip assembly 560, depicted as a flange member 562, having a ridge engaging channel 564 formed therein, is disposed on the first side 550 of the rear wall 414 near the lower end 554 thereof. The flange member 562, which extends between the first end 556 and the second end 558 of the rear wall 414, terminates a distance 566 from the lower end 554 of the rear wall 414. The distance 566 substantially corresponds to the thickness of the material forming the floor 426 of the animal shelter 410. Thus, the rear wall 414 of the animal shelter 410 can be secured adjacent the rearward end 436 of the floor 426 by positioning the rear wall 414 perpendicular to the floor 426 at a position above and substantially adjacent the rearward end 436 of the floor 426, and thereafter moving the rear wall 414 in a downward direction so that the portion of the ridge 440 disposed along the rearward end 436 of the floor 426 engages the channel 564 of the flange member 552.

Referring again to FIG. 11, the first side wall 416 of the animal shelter 410 is a substantially rectangular-shaped member having a first side (not shown) a second side 570, an upper end 572, a lower end 574, a first end 576, and a second end 578. A first flange 580 is formed on the second end 578 of the first side wall 416 such that the flange 580 extends from the second side 570 of the first side wall 416 in a direction substantially perpendicular to the plane of the first side wall 416. The flange 580 extends from the upper end 572 of the first side wall 416 along the second side 570 thereof in the direction of the lower end 574 of the first side wall 416.

The first side wall 416 of the animal shelter 412 is further provided with a second flange 582 formed on the first end 576 of the first side wall 416 such that the second flange 582 extends from the second side 570 of the first side wall 416 in a direction substantially perpendicular to the plane of the first side wall 416. The second flange 582 extends from the upper end 572 of the first side wall 416 along the second end 570 thereof in the direction of the lower end 574 of the first side wall 416.

A third flange 584 is formed near the first end 576 of the first side wall 416 such that the third flange 584 extends from the second side 570 of the first side wall 416 in a direction substantially perpendicular to the plane of the first side wall 416. The third flange 584 which is substantially parallel to the second flange 582 extends from the upper end 572 of the first side wall 416 along the second side 570 thereof in the direction of the lower end 574 of the first side wall 416, the third flange 584 terminating a distance 586 from the lower end 574 of the first side wall 416. The spatially disposed second and third flanges 582, 584, and the portion of the second side 570 of the first side wall 416 disposed therebetween, cooperate to form a channel or groove 588. The channel or groove 588 so formed is of a sufficient width and depth to receive a portion of the body member 450 and the first trough 468 of the feed dispenser 448 when the animal shelter 410 is in an assembled position as will more fully be described hereinafter.

A clip assembly 590 (which is substantially identical in construction to the clip assembly 560 hereinbefore described) is disposed on the second side 570 of the first side wall 416, the clip assembly 590 being adapted to engage the portion of the ridge 440 disposed along the first side 430 of the floor 426 so that the first side wall 416 can be secured to the first side 430 of the floor 426. The clip assembly 590, depicted as a flange member 592, having a ridge engaging channel 594 formed therein, is disposed on the second side 570 of the first side wall 416 near the lower end 574 thereof. The flange member 592 which extends between the first flange 580 and the third flange 584 on the second side 570 of the first wall 416, terminates a distance 596 from the lower end 574 of the first side wall 416. The distance 596 substantially corresponds to the thickness of the material forming the floor 426 of the animal shelter 410. Thus, the first side wall 416 of the animal shelter 410 can be secured adjacent the first side 430 of the floor 426 by positioning the first side wall 416 perpendicular to the floor 426 at a position above and substantially adjacent the first side 430 of the floor 426, and thereafter moving the first side wall 416 in a downward direction so that the portion of the ridge 440 disposed along the first side 430 of the floor 426 engages the channel 564 of the flange member 562. In addition, it should be noted that when the animal shelter 410 is in the assembled position the first flange 580 on the second end 578 of the first side wall 416 is disposed adjacent the first end 556 of the rear wall 414 via the second side (not shown) of the rear wall 414.

The second side wall 418 of the animal shelter 10 is a substantially rectangular-shaped member having a first side (not shown), a second side 600, an upper end 602, a lower end 604, a first end 606, and a second end 608. A first flange 610 is formed on the second end 608 of the second side wall 418 such that the flange 610 extends from the first side (not shown) of the second side wall 418 in a direction substantially perpendicular to the plane of the second side wall 418. The flange 610 extends from the upper end 602 of the second side wall 418 along the first side (not shown) thereof in the direction of the lower end 604 of the second side wall 418.

The second side wall 418 of the animal shelter 410 is further provided with a second flange 612 formed on the first end 606 of the second side wall 418 such that the second flange 612 extends from the first side (not shown) of the second side wall 418 in a direction substantially perpendicular to the plane of the second side wall 418. The second flange 612 extends from the upper end 602 of the second side wall 418 along the first end 606 thereof in the direction of the lower end 604 of the second side wall 418.

A third flange 614 is formed near the first end 606 of the second side wall 418 such that the third flange 614 extends from the first side (not shown) of the second side wall 418 in a direction substantially perpendicular to the plane of the second side wall 418. The third flange 614 which is substantially parallel with the second flange 612 extends from the upper end 602 of the second side wall 418 along the first side (not shown) thereof in the direction of the lower end 604 of the second side wall 418, the third flange 614 terminating a distance (not shown) from the lower end 604 of the second side wall 418. The spatially disposed second and third flanges 612, 614, and the portion of the first side (not shown) of the second side wall 418 disposed therebetween, cooperate to form a channel or groove 616. The channel or groove 616 so formed is of a sufficient width and depth to receive a portion of the body member 450 and the second trough 470 of the feed dispenser 448 when the animal shelter 410 is in an assembled position as will be more fully described hereinafter.

A clip assembly 618 is disposed on the first side (not shown) of the second side wall 418, the clip assembly 618 being adapted to engage the portion of the ridge 440 disposed along the second end 438 on the first side 430 of the floor 426 so that the second side wall 418 can be secured to the first side 430 of the floor 426. The clip assembly 618, depicted as a flange member 620 having a ridge engaging channel 622 formed therein, is disposed on the first side (not shown) of the second side wall 418 near the lower end 604 thereof. The flange member 620 which extends between the first flange 610 and the third flange 614 on the first side (not shown) of the second side wall 418, terminates a distance from the lower end 604 of the second side wall 418. The distance at which the third flange 620 terminates from the lower end 604 of the second side wall 418 substantially corresponds to the thickness of the material forming the floor 426 of the animal shelter 2. Thus, the second side wall 418 of the animal shelter 410 can be secured adjacent the second end 438 of the floor 426 by positioning the second side wall 418 perpendicular to the floor 426 at a position above and substantially adjacent the second end 438 of the floor 426, and thereafter moving the second side wall 418 in a downward direction so that the portion of the ridge 440 disposed along the second end 438 of the first side 430 of the floor 426 engages the channel 622 of the flange member 620. In addition, it should be noted that when the animal shelter 410 is in the assembled position the first flange 610 on the second end 608 of the second side wall 418 is disposed adjacent the second end 558 of the rear wall 414 via the second side (not shown) of the rear wall 414. Further, as is evident from the above description, the first side wall 416 and the second side wall 418 of the animal shelter 410 are mirror images of each other.

Once the rear wall 414, the first side wall 416, and the second side wall 418 have been connected in an assembled position to the floor 426 as set forth above, the feed dispenser 448 forming the front wall 412 of the animal shelter 410 can be positioned within the channel or groove 588 formed on the first side wall 416 and the channel or groove 616 formed on the second side wall 418, and the feed dispenser 418 moved in a downward direction through the beforementioned channels or grooves 588, 616 until the first and second troughs 468, 470 of the feed dispenser 448 are disposed adjacent the first side 430 of the floor 426. When the feed dispenser 448 is so positioned within the channels or grooves 588, 616 of the first and second side walls 416, 418, respectively, the upper end 456 of the body member 450 of the feed dispenser 448 is substantially coplanar with the upper ends 572, 602 of the first and second side walls 416, 418, and the upper end 552 of the rear wall 414. The feed dispenser 448 is stabilized in the assembled position via the ridge engaging channel 484 of the first trough 468 engaging the portion of the ridge 440 disposed on the forward end 432 of the first side 430 of the floor 426 between the opening 422 in the ridge 440 and the first end 434 of the floor 426; and the ridge engaging channel 498 of the second trough 470 engaging the other portion of the ridge 440 on the forward end 432 of the first side 430 of the floor 426 disposed between the opening 442 in the ridge 440 and the second end 438 of the floor 426 as heretofore discussed.

As previously stated, the roof 422 of the animal shelter 410 is positioned upon and supported by the feed dispenser 448 (when same is employed as the front wall 412 of the animal shelter 410), the rear wall 414, the first side wall 416, and the second side wall 418 when same are in the assembled position. The roof 422 can be fabricated as a unitary member or as a plurality of members, which are pivotally connected together.

The roof 422 of the animal shelter 410 comprises a first or rearwardly disposed member 630, a second or forwardly disposed member 632, and a hinge assembly 634 for pivotally connecting the first member 630 to the second member 632. The first member 630, a generally rectangularly-shaped member, is provided with a lower side 636 (see FIG. 14), an upper side 638, a forward end 640, a first end 642, a rearward end 644, and a second end 646. The first member 630 is fabricated such that the rearward end 644 is positionable upon and supported by the upper end 552 of the rear wall 414, the first end 642 of the first member 630 is positionable upon and supported by a portion of the upper end 552 of the first side wall 416, and the second end 646 of the first member 330 is positionable upon and supported by the upper end 602 of the second wall 418 of the animal shelter 410. The forward end 640 of the first member 630 terminates a distance 6 from the front wall 412 of the animal shelter 410, the distance substantially corresponding to the width of the channels or grooves 588, 616 formed on the first ends 576, 606 of the first and second side walls 416, 418, respectively, such that the feed dispenser 448 can be slidably disposed in the channels 588, 616, as hereinbefore described.

The second or forwardly disposed member 632 of the roof 422, a generally rectangular-shaped member, is provided with a lower side 650, (see FIG. 14), an upper side 652, a forward end 654, a first end 656, a rearward end 658, and a second end 660. The second member 632 of the roof 422 is fabricated such that the rearward end 658 can be disposed substantially adjacent the forward end 640 of the first member 630 of the roof 422, the first and second ends 656, 660 of the second member 632 are positionable upon and supported by a forward portion of the upper ends 552, 602 of the first and second side walls 416, 418, respectively, and the forward end 654 of the second member 632 is positionable upon and supported by the upper end 456 of the body member 450 of the feed dispenser 448.

The first and second members 630, 632 of the roof 422 are pivotally connected via their respective forward end 640 and rearward end 658 by the hinge assembly 634. Any suitable hinge assembly can be employed, such as a piano hinge 662, as illustrated in FIG. 11, or a plurality of hinges. It should be noted that by pivotally connecting the first member 630 to the second member 632 as hereinbefore described, the second member 632 can be pivoted in an upward direction to allow one to have access to the feed dispenser 448 forming the front wall 412 of the animal shelter 410. For dispensing feed and water into the feed dispenser 448 of the animal shelter 410, or for removing the feed dispenser 448 for cleaning of same.

The roof 422 further comprises a first angularly-disposed member 670 and a second angular-disposed member 672 which cooperate with the first and second members 630, 632 of the roof 422 to provide the roof 422 with an overhang. The first angularly-disposed member 670 is positioned on the first member 630 around the first end 642, the rearward end 644, and the second end 646 such that the first angularly-disposed member 670 depends from the first member 630 in a downwardly direction and is angularly-disposed in a direction away from the rear wall 414, the first side wall 416, and the second side wall 418 of the animal shelter 410 as shown.

The second angularly-disposed member 672 is positioned around the forward end 654, the first end 656, and the second end 660 of the second member 632 of the roof 422 such that the second angularly-disposed member 672 depends from the second member 632 in a downwardly direction and is angularly-disposed in a direction away from the front wall 412, the first side wall 416, and the second side wall 418 of the animal shelter 410. The first and second angularly-disposed members 470, 472 are formed so that when the first and second members 630, 632 of the roof 422 are in the normal position, as depicted in FIG. 11, the adjacent portions of the first angularly-disposed member 670 and the second angularly-disposed member 672 are substantially coplanar.

The roof 422 constructed from the first and second members 630, 632 as described above can readily be positioned upon and supported by the upper end 456 of the body member 450 of the feed dispenser 448 (i.e., the front wall 412 of the animal shelter 410), the upper end 552 of the rear wall 414, and the upper ends 572, 602 of the first and second side members 416, 418, respectively, via the lower sides 636, 650 of the first and second members 630, 632 of the roof 422 when same are in the assembled position and interconnected via the hinge assembly 634.

In order to stabilize the roof 422 of the animal shelter 410 the first side wall 416 is provided with a plurality of post members, such as post members 676 and 678, disposed on the upper end 572 of the first side member 416. Similarly, a plurality of post members, such as post members 680, 682, are disposed on the upper end 602 of the second side member 418 substantially as shown in the drawing.

Referring now to FIG. 14, in combination with FIG. 11, the lower side 636 of the first member 630 of the roof 422 is provided with a plurality of recesses 684, 686, 688 and 690 disposed therein substantially as shown. The before-mentioned recesses cooperate with the before-mentioned post members on the first and second sides 416, 418 of the animal shelter 410 to secure the roof 422 on the first and second side walls 416, 418 of the animal shelter 410. Such can readily be accomplished by positioning the post members 676 and 678 on the first side wall 416 in two of the recesses, such as recesses 684, 686, and positioning the post members 680, 682 on the second side wall 418 in the recesses 688, 690.

In order to provide the animal shelter 410 with a more realistic appearance, the bowl 424 is disposed on the upper side 638 of the first member 630 of the roof 422. The bowl 424 can be utilized to provide a source of water for the animal, or as a source for supplying treats and the like to the animal.

As heretofore set forth with reference to FIGS. 7, 8 and 9, the water dispensing assembly 122 can be disposed within the cavity 454 in the body member 450 of the feed dispenser 488 such that the water dispensing assembly 122 openly communicates with one of the first and second troughs 468, 470. The positioning of the water dispensing assembly 122 within the cavity 454 of the feed dispenser 448 is identical to that hereintofore disclosed with reference to FIGS. 7, 8 and 9 of the drawings.

Referring now to FIG. 15, the floor 426 of the animal shelter 410 is illustrated as further comprising a plurality of beams 700, 702, 704 and 706 disposed on the upper side 430 of the floor 426. The beams 700 and 702 are interconnected with a portion of the ridge 440 to provide a confined area 708 into which the first trough 468 of the trough assembly 452 can be positioned to stabilize the feed dispenser 448 when the animal shelter 410 is in the assembled position; and the beams 704, 706 are interconnected with a portion of the ridge 440 to provide a confined area 710 into which the second trough 470 of the trough assembly 452 can be positioned to stabilize the feed dispenser 448 when the animal shelter 410 is in the assembled position and the feed dispenser 448 is employed as the front wall.

The first beam 700 is provided with a first end 712 and a second end 714; and the second beam 702 is provided with a first end 716 and a second end 718. The first end 712 of the first beam 700 abuts the portion of the ridge 440 defining one side of the opening 442 in the ridge 440. The first beam 700 is disposed on the upper side 430 of the floor 426 such that the elongated axis of the first beam 700 is substantially perpendicular to the portion of the ridge disposed along the forward end 432 of the floor 426. The second beam 702 is disposed in a parallel spatial relationship with the portion of the ridge 440 disposed along the forward end 432 of the floor 426 such that the second end 718 of the second beam 702 abuts the second end 714 of the first beam 700, and the first end 716 of the second beam 702 abuts a portion of the ridge 440 disposed along the first end 434 of the floor 426 substantially as shown in the drawing.

The third beam 704 is provided with a first end 720 and a second end 722; and the fourth beam 706 is provided with a first end 724 and a second end 726. The first end 720 of the third beam 706 abuts the portion of the ridge 440 defining the other side of the opening 442 in the ridge 440. The third beam 706 is disposed on the upper side 430 of the floor 426 such that the elongated axis of the third beam 706 is substantially perpendicular to the portion of the ridge 440 disposed along the forward end 432 of the floor 426. The fourth beam 708 is disposed in a parallel spatial relationship with the portion of the ridge 440 disposed along the forward end 432 of the floor 426 such that the first end 724 of the fourth beam 708 abuts the second end 722 of the third beam 706, and the second end 726 of the fourth beam 708 abuts a portion of the ridge 440 disposed along the second end 438 of the floor 426 substantially as shown in the drawing.

Referring now to FIGS. 16, 17 and 18, shown therein and designated by the general reference numeral 750 is another embodiment of an improved animal shelter constructed in accordance with the present invention. The animal shelter 750 is provided with a first side wall 752, a rear wall 754, a second side wall 756, a roof 758, and a floor 760. The feed dispenser 28 heretofore described in detail with reference to FIGS. 1, 2, 5, 7 and 10 is positionable between the first and second side walls 752 and 756 of the animal shelter 750 such that the feed dispenser 28 serves as the front wall for the animal shelter 750. Since the feed dispenser 28 has heretofore been described in detail, a detailed description of such component will not hereinafter be set forth.

The first side wall 752 of the animal shelter 750 is a substantially rectangular-shaped member having a first side 761, a second side 762, an upper end 764, a lower end 766, a first end 768, and a second end 770. A pair of spatially-disposed flanges 772, 774 are formed on the first end 768 of the first side wall 752 such that the flanges 772, 774 extend from the second side 762 of the first side wall 752 in a direction substantially perpendicular to the plane of the first side wall 752. The spatially-disposed flanges 772, 774 extend from the upper end 764 of the first side wall 752 along the second side 762 thereof to the lower end 766 of the first side wall 752. The spatially-disposed flanges 772, 774, and the portion of the second side 762 of the first side wall 752 disposed therebetween, cooperate to form a channel or groove 776. The channel or groove 776 so formed is of a sufficient width and depth to receive a portion of the body member 30 and the first trough 48 of the feed dispenser 28 when the feed dispenser 28 is positioned therein and employed as the front wall for the animal shelter 750. The first side wall 752 is connected to the floor 760 via the lower end 766 of the first side wall 752 and one edge portion of the floor 760 such that the first side wall 752 is disposed substantially perpendicular to the plane of the floor 760.

The rear wall 754 of the animal shelter 750 is a substantially rectagular-shaped member having a first side 780, a second side (not shown), an upper end 782, a lower end 784, a first end 786, and a second end 788. The rear wall 754 is connected to the floor 760 of the animal shelter 750 via the lower end 784 of the rear wall 754 such that the rear wall 754 is disposed substantially perpendicular to the lane of the floor 760. Further, the first end 786 of the rear wall 754 is connected to the second end 770 of the first side wall 752.

The second side wall 756 of the animal shelter 750 is a substantially rectangular-shaped member having a first side 789, a second side 790, an upper end 792, a lower end 794, a first end 796, and a second end 798. A pair of spatially-disposed flanges 800, 802 are formed on the first end 796 of the second side wall 756 such that the flanges 800, 802 extend from the first side 789 of the second side wall 756 in a direction substantially perpendicular to the plane of the second side wall 756. The spatially-disposed flanges 800, 802 are identical in construction to the flanges 772, 774 on the second side 762 of the first side wall 752 as hereinbefore described. Thus, the flanges 800, 802 extend from the upper end 792 of the second side wall 756 along the first side 789 thereof to the lower end 794 of the second side wall 756. The spatially-disposed flanges 800, 802, and the portion of the first side 789 of the second side wall 756 disposed therebetween, cooperate to form a channel or groove 804. The channel or groove 804 so formed is of a sufficient width and depth to receive a portion of the body member 30 and the second trough 50 of the feed dispenser 28 when the feed dispenser 28 is employed as the front wall of the animal shelter 750 and same is in the assembled position.

The second side wall 756 is connected to the floor 760 of the animal shelter 750 (via the remaining side edge portion of the floor 760 and the lower end 794 of the second side wall 756) such that the second side wall 756 is disposed substantially parallel to the first side wall 752 of the animal shelter 750 and thus perpendicular to the plane of the floor 760. The second end 798 of the second side wall 756 is connected to the second end 788 of the rear wall 754 such that the floor 760, the first side wall 752, the rear wall 754, and the second side wall 756 of the animal shelter 750 provide a housing having the configuration substantially as shown in the drawings.

An angularly-disposed member 806 is disposed along the upper end 764 of the first side wall 752, the upper end 782 of the rear wall 754, and the upper end 792 of the second side wall 756. Further, the angularly-disposed member 806 extends between the first flange 772 of the first side wall 752 and the first flange 800 of the second side wall 756 substantially as shown in the drawing. The angularly-disposed member 806 depends from the first side wall 752, the rear wall 754, the second side wall 756, and the first flanges 772, 800 of the first and second side wall 752, 756, respectively, in a downwardly, outwardly direction from the before-mentioned walls and flanges. Thus, the angularly-disposed member 806 provides the animal shelter 750 with an overhang.

A recess 808 is formed in an upper portion 810 of the angularly-disposed member 806, the recess 808 being adapted to receive the roof 758 of the animal shelter 750 when the animal shelter 750 is in the assembled position. The roof 758 of the animal shelter 750 is depicted as being formed of a first or rearward member 812 and a second or forward member 814. The first and second members 812, 814 of the roof 758 can be pivotally connected together such that the second member 814 can be moved in a vertically disposed position so that one can have access to the feed dispenser 28 when the feed dispenser 28 is positioned in the animal shelter 750. Any suitable means can be employed for connecting the first member 812 to the second member 814 of the roof 758, such as the hinges depicted in FIGS. 1, 10 and 11 of the drawings.

It should be noted that the animal shelter 750 can be formed of separate elements, or the animal shelter 750 can be formed such that the first side wall 752, the rear side wall 754, the second side wall 756, the floor 760, the flanges 772, 774 of the first side wall 752, the flanges 800, 802 of the second side wall 756, and the angularly-disposed member 806 are of a unitary construction and thus formed as a single unit.

Referring now to FIGS. 19, 20 and 21, shown therein and designated by the general reference numeral 820 is another embodiment of an improved animal shelter constructed in accordance with the present invention. The animal shelter 820 is provided with a first side wall 822, a rear wall 824, a second side wall 826, a roof 828, and a floor 830. The feed dispenser 28 heretofore described in detail with reference to FIGS. 1, 2, 5, 7 and 10 is positionable between the first and second side walls 822 and 826 of the animal shelter 820 such that the feed dispenser 28 serves as the front wall for the animal shelter 820. Since the feed dispenser 28 has heretofore been described in detail, a detailed description of such component will not hereinafter be set forth.

The first side wall 822 of the animal shelter 820 is a substantially rectangular-shaped member having a first side 832, a second side 834, an upper end 836, a lower end 838, a first end 840, and a second end 842. A pair of spatially-disposed flanges 844, 846 are formed on the first end 840 of the first side wall 822 such that the flanges 844, 846 extend from the second side 834 of the first side wall 822 in a direction substantially perpendicular to the plane of the first side wall 822. The spatially-disposed flanges 844, 846 extend from the upper end 836 of the first side wall 822 along the second side 834 thereof to the lower and 838 of the first side wall 822. The spatially-disposed flanges 844, 846, and the portion of the second side 834 of the first side wall 822 disposed therebetween, cooperate to form a channel or groove 848. The channel or groove 848 so formed is of a sufficient width and depth to receive a portion of the body member 30 and the first trough 48 of the feed dispenser 28 when the feed dispenser 28 is positioned therein and employed as the front wall for the animal shelter 820. The first side wall 822 is connected to the floor 830 via the lower end 838 of the first side wall 822 and one edge portion of the floor 830 such that the first side wall 822 is disposed substantially perpendicular to the plane of the floor 830.

The rear wall 824 of the animal shelter 820 is a substantially rectangular-shaped member having a first side 850, a second side 851, an upper end 852, a lower end 854, a first end 856, and a second end 858. The rear wall 824 is connected to the floor 830 of the animal shelter 820 via the lower end 854 of the rear wall 824 such that the rear wall 824 is disposed substantially perpendicular to the plane of the floor 830. Further, the first end 856 of the rear wall 824 is connected to the second end 842 of the first side wall 822.

The second side wall 826 of the animal shelter 820 is a substantially rectangular-shaped member having a first side 860, a second side 862, an upper end 864, a lower end 866, a first end 868, and a second end 870. A pair of spatially-disposed flanges 872, 874 are formed on the first end 868 of the second side wall 826 such that the flanges 872, 874 extend from the first side 860 of the second side wall 826 in a direction substantially perpendicular to the plane of the second side wall 826. The spatially-disposed flanges 872, 874 are identical in construction to the flanges 844, 846 on the second side 834 of the first side wall 822 as hereinbefore described. Thus, the flanges 872, 874 extend from the upper end 864 of the second side wall 826 along the first side 860 thereof to the lower end 866 of the second side wall 826. The spatially-disposed flanges 872, 874, and the portion of the first side 860 of the second side wall 826 disposed therebetween, cooperate to form a channel or groove 876. The channel or groove 876 so formed is of a sufficient width and depth to receive a portion of the body member 30 and the second trough 50 of the feed dispenser 28 when the feed dispenser 28 is employed as the front wall of the animal shelter 750 and same is in the assembled position.

The second side wall 826 is connected to the floor 830 of the animal shelter 820 (via the remaining side edge portion of the floor 830 and the lower end 866 of the second side wall 826) such that the second side wall 826 is disposed substantially parallel to the first side wall 822 of the animal shelter 820 and perpendicular to the plane of the floor 830. The second end 870 of the second side wall 826 is connected to the second end 858 of the rear wall 824 such that the floor 830, the first side wall 822, the rear wall 824, and the second side wall 826 of the animal shelter 820 provide a housing having the configuration substantially as shown in the drawings.

It should be noted that the upper end 836 of the first side wall 822, the upper end 852 of the rear wall 824, the upper end 864 of the second side wall 826, and the upper end 36 of the body member 30 of the feed dispenser 28 are substantially coplanar when the feed dispenser 28 is positioned between the first and second side walls 822, 826 as heretofore described. Further, the first side wall 822, the rear wall 824, the second side wall 826, the flanges 844, 846 of the first side wall 822, and the flanges 872, 874 of the second side wall 826 can be formed as separate elements, or as a single unit of unitary construction.

The roof 828 of the animal shelter 820 is positioned upon and supported by the feed dispenser 28 (when same is employed as the front wall of the animal shelter 828), the first side wall 822, the rear wall 824, and the second side wall 826. The roof 828 can be fabricated as a unitary member or from a plurality of members which are pivotally connected together.

As more clearly shown in FIG. 19, the roof 828 of the animal shelter 820 comprises a first or rearwardly disposed member 880 and a second or forwardly disposed member 882. The first member 880, a generally rectangularly-shaped member, is provided with a lower side (not shown), an upper side 884, a forward end 886, a first end 888, a rearward end 890, and a second end 892. The first member 880 is fabricated such that the rearward end 890 is positionable upon and supported by the upper end 852 of the rear wall 824, the first end 888 of the first member 880 is positionable upon and supported by a portion of the upper end 836 of the first side wall 822, and the second end 892 of the first member 880 is positionable upon and supported by the upper end 864 of the second side wall 826 of the animal shelter 820.

The second or forwardly disposed member 882 of the roof 828, a generally rectangular-shaped member, is provided with a lower side 893, an upper side 894, a forward end 896, a first end 898, a rearward end 900, and a second end 902. The second member 882 of the roof 828 is fabricated such that the rearward end 900 can be disposed substantially adjacent the forward end 886 of the first member 880 of the roof 828, the first and second ends 898, 902 of the second member 882 are positionable upon and supported by a forward portions of the upper ends 836, 864 of the first and second side walls 822, 826, respectively, and the forward end 896 of the second member 882 is positionable upon and supported by the upper end 36 of the body member 30 of the feed dispenser 28.

The first and second member 880, 882 of the roof 828 are pivotally connected via their respective forward end 886 and rearward end 900 by any suitable means such as the hinge assembly depicted in FIG. 1. Any suitable hinge assembly can be employed, such as a piano hinge or a pair of hinges. It should be noted that by pivotally connecting the first member 880 to the second member 882, the second member 882 can be pivoted in an upward direction to allow one to have ready access to the feed dispenser 28 forming the front wall of the animal shelter 820, either for the purpose of dispensing feed or water into the feed dispenser 28 of the animal shelter 820, or for removing the feed dispenser 28 or cleaning of same.

The roof 828 further comprises a first angularly-disposed member 904 and a second angularly-disposed member 906 which cooperate with the first and second members 880, 882 of the roof 828 to provide the roof 828 with an overhang. The first angularly-disposed member 904 is positioned on the first member 880 around the first end 898, the rearward end 900, and the second end 902 such that the first angularly-disposed member 904 depends from the first member 880 in a downwardly direction and is angularly disposed in a direction away from the first side wall 822, the rear wall 824, and the second side wall 826 of the animal shelter 820 as shown.

The second angularly-disposed member 906 is positioned around the forward end 896, the first end 898, and the second end 902 of the second member 882 of the roof 828 such that the second angularly-disposed member 908 depends from the second member 882 in a downwardly direction and is angularly-disposed in a direction away from the feed dispenser 28 (i.e., the front wall), the first side wall 822, and the second side wall 826 of the animal shelter 820. The first and second angularly-disposed members 904, 906 are formed so that when the first and second members 880, 882 of the roof 828 are in the normal position, as depicted in FIG. 19, the adjacent portions of the first angularly-disposed member 904 and the second angularly-disposed member 906 are coplanar.

The roof 828 constructed from the first and second members 880, 882 as described above can readily be positioned upon and supported by the upper end 36 of the body member 30 of the feed dispenser 28 (i.e., the front wall of the animal shelter 820), the upper end 836 of the first side wall 822, the upper end 852 of the rear wall 824, and the upper end 864 of the second side wall 826 via the lower sides (not shown) of the first and second members 880, 882 of the roof 828 when same are in the assembled position and interconnected.

In the event one should determine it desirable to detachably connect the roof 828 of the animal shelter 820, such can be accomplished by providing a groove 910 (see FIG. 21) in the lower side 893 of the first member 880 of the roof 828, the groove 910 extending along the first end 888, the rearward end 890 and the second end 892 of the first member 880. The groove 910 is adapted to receive the portion of the upper end 836 of the first side wall 822, the upper end 852 of the rear wall 824, and the upper end 864 of the second side wall 826 which support the first member 880 of the roof 828.

In order to provide the animal shelter with a more realistic appearance, the bowl 24 (see FIG. 1) can be positioned upon the upper side 884 of the first member 880 of the roof 828. The bowl 24 can be utilized to provide a source of water for the animal, or as a source for supplying treats and the like to the animal.

The animal shelter of the present invention and the various feed dispensers can be fabricated of any suitable material, such as plastic materials, cardboard, wood products, metal, and the like. In addition, various elements of each of the embodiments can be interchanged with elements illustrated in the various embodiments of the animal shelter of the present invention without departing from the scope of the invention.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the following claims.

What is claimed:

1. An improved animal shelter comprising:

a floor;

a first side wall having a first side, a second side, an upper end, a lower end, a first end, and a second end, the first side wall being connected to the floor via the lower end thereof such that the first side wall is disposed substantially perpendicular to the plane of the floor;

a second side wall having a first side, a second side, an upper end, a lower end, a first end and a second end, the second side wall being connected to the floor via the lower end thereof such that the second side wall is disposed substantially perpendicular to the plane of the floor in a parallel, spatial relationship with the first side wall;

a rear wall having a first side, a second side, an upper end, a lower end, a first end and a second end, the rear wall being disposed between the first and second side walls and interconnecting the second ends of the first and second side walls;

a feed dispenser assembly having an opening extending therethrough, the feed dispenser assembly having an upper end, a lower end, a first end and a second end, the feed dispenser assembly further characterized as having a cavity formed in at least a portion thereof, the cavity extending through the feed dispenser assembly from the upper end to the lower end, the feed dispenser assembly being disposed between the first and second side walls and forming the front wall of the shelter; and a roof positionable upon and supported by the upper end of each of the first side walls, the second side wall, and the rear wall.

2. The animal shelter of claim 1 wherein the floor, the first side wall, the second side wall, and the rear wall are of unitary construction.

3. The animal shelter of claim 2 which further comprises channel-forming means formed on the first and second side walls for slidably receiving the feed dispenser and stabilizing the feed dispenser between the first and second side walls.

4. The animal shelter of claim 3 wherein the channel-forming means comprises:

a first flange disposed on the first end of the first side wall such that the first flange extends from the second side of the first side wall and is disposed substantially perpendicular to the plane of the first side wall;

a second flange disposed on the second side of the first side wall in a parallel, spatial relationship with the first flange of the first side wall, the first and second flanges of the first side wall cooperating with a portion of the first side wall disposed therebetween to form a channel for slidably receiving one of the feed dispenser;

a first flange disposed on the first end of the second side wall such that the first flange extends from the first side of the second side wall and is disposed substantially perpendicular to the plane of the second side wall; and a second flange disposed on the first side of the second side wall in a parallel, spatial relationship with the first flange of the second side wall, the first and second flanges of the second side wall cooperating with a portion of the second side wall disposed therebetween to form a channel for slidably receiving a second end of the feed dispenser.

5. The animal shelter of claim 4 which further comprises:

an angularly-disposed member formed along the upper ends of the first side wall, the rear wall, the second side wall and extending between the first flange of the first side wall and the first flange of the second side wall, the angularly-disposed member extending in a downward, outward direction from the walls so as to provide the animal shelter with an overhang portion, the angularly-disposed member further characterized as having a recess formed along an interior perimeter thereof, the recess being adapted to receive the roof of the animal shelter.

6. The animal shelter of claim 5 wherein the roof comprises:

a first member having a forward end and a rearward end;

a second member having a forward end and a rearward end; and hinge means for connecting the forward end of the first member to the rearward end of the second member.

7. The animal shelter of claim 6 which further comprises a bowl positionable on the first member of the roof.

8. The animal shelter of claim 4 wherein the roof comprises:

a first member having a lower side, an upper side, a forward end, a first end, a rearward end, and a second end;

a second member having a lower side, an upper side, a forward end, a first end, a rearward end and a second end; and hinge means for pivotally connecting the forward end of the first member to the rearward end of the second member.

9. The animal shelter of claim 8 wherein the roof further comprises:

a first angularly-disposed member disposed along the first end, the rearward end, and the second end of the first member, the first angularly-disposed member extending from the first member in a downwardly direction away from the first side wall, the second side wall, and the rear wall; and a second angularly-disposed member disposed along the first end, the forward end and the second end of the second member, the second angularly-disposed member extending from the second member in a downwardly direction away from the first side wall, the second side wall and the feed dispenser when the animal shelter is in the assembled position.

10. The animal shelter of claim 8 wherein the lower side of the first member of the roof disposed adjacent the upper end of the first side wall, the second side wall, and the rear wall when the first member is positioned and supported thereon is provided with a groove which is adapted to receive the upper end of the first side wall, the second side wall, and the rear wall to secure the first member of the roof thereon.

11. The animal shelter of claim 10 which further comprises a bowl positionable on the upper side of the first member of the roof.

12. The animal shelter of claim 1 wherein the feed dispenser assembly comprises:

a body member having an upper end and a lower end, the body member further characterized as having a cavity formed therein, the cavity extending from the upper end of the body member to the lower end; and a feed trough assembly having a cavity formed therein which openly communicates with the cavity in the body member, the feed trough assembly being disposed adjacent the lower end of the body member and extending a distance from the body member such that a portion of the cavity in the trough assembly is accessible to an animal.

13. The improved animal shelter of claim 12 wherein the body member of the feed dispenser comprises:
a first side wall;
a substantially parallel, spatially disposed second side wall;
a first end wall; and,
a spatially disposed second end wall, the first side wall, the first end wall, the second side wall and the second end wall being connected such that the body member is provided with a rectangular-shaped configuration having the cavity formed therein.

14. The improved animal shelter of claim 13 wherein the opening extending through the feed dispenser is formed through the first and second side walls of the body member, and wherein the body member further comprises:
partition means disposed between the first and second side members and around the opening formed therein for sealing the cavity in the body member from the opening extending therethrough, the partition means dividing the cavity in the body member into a first cavity portion and a second cavity portion.

15. The improved animal shelter of claim 14 wherein the partition means disposed between the first and second side walls of the body member along an upper portion of the opening formed therethrough cooperates with one of the first and second end walls, and the first and second side walls to support a water-dispensing assembly in one of the first and second portions of the cavity within the body member.

16. The improved animal shelter of claim 15 wherein the trough assembly comprises:
a first trough disposed adjacent the lower end of the body member and openly communicating with the first portion of the cavity; and
a second trough disposed adjacent the lower end of the body member and openly communicating with the second portion of the cavity formed therein.

17. The improved animal shelter of claim 16 wherein the second side wall of the body member is provided with a pair of arcuate-shaped openings in the lower end thereof, one of the arcuate-shaped openings being positioned above the first trough, the second of the arcuate-shaped openings being positioned above the second trough.

18. The improved animal shelter of claim 1 which further comprises:
first connecting means for connecting the lower end of the first side wall, the second side wall, and the rear wall to the floor; and
second connecting means for connecting the first and second ends of the rear wall to the second ends of the first and second side walls.

19. The improved animal shelter of claim 18 wherein the floor is a substantially rectangular-shaped member having a first side, a second side, a forward end, a first end, a rearward end, and a second end, and the first connecting means comprises:
a first ridge disposed on the first side of the floor along the first end, the rearward end, and the second end thereof, the first ridge being disposed substantially perpendicular to the plane of the floor, the first ridge having a channel formed therein, the channel being adapted to receive the lower end of each of the first and second side walls and the lower end of the rear wall for securing the first and second side walls and the rear wall to the floor in a substantially perpendicular position with respect to the floor.

20. The improved animal shelter of claim 18 wherein the second connecting means comprises:
a first pair of parallel, spatially disposed flanges formed on the first end of the rear wall such that the first pair of flanges extend therefrom in a direction substantially perpendicular to the plane of the rear wall, the first pair of flanges cooperating with the portion of the rear wall disposed therebetween to form a groove which is adapted to receive the second end of the first side wall and secure the first side wall to the first end of the rear wall; and
a second pair of parallel, spatially disposed flanges formed on the second end of the rear wall such that the second pair of flanges extend therefrom in the same direction as the first pair of flanges, the second pair of flanges extending from the rear wall in a direction substantially perpendicular to the plane of the rear wall, the second pair of flanges cooperating with the portion of the rear wall disposed therebetween to form a groove which is adapted to receive the second end of the second side wall and secure the second side wall to the second end of the rear wall.

21. The improved animal shelter of claim 19 which further comprises:
a second ridge having a first end and a second end, the second ridge being disposed on the first side of the floor and extending along a portion of the forward end of the floor; and
a third ridge having a first end and a second end, the third ridge being disposed on the first side of the floor and extending along a second portion of the forward edge of the floor, the second and third ridges being aligned one with another in a spatial relationship such that a central opening is formed therebetween, the central opening substantially corresponding to the width of the opening in the body member of the feed dispensing assembly, the first end of the second ridge abutting the first ridge disposed along the first side of the floor and terminating at the forward end thereof, the second end of the third ridge abutting the first ridge disposed along the second side of the floor and terminating at the forward end thereof.

22. The improved animal shelter of claim 2 which further comprises:
a first beam disposed on the first side of the floor, the first beam having a first end and a second end, the first end of the first beam abutting the second end of the second ridge, the first beam being disposed on the first side of the floor such that the elongated axis of the first beam is substantially perpendicular to the elongated axis of the second ridge;
a second beam disposed on the first side of the floor in a parallel, spatial relationship with the second ridge, the first end of the second beam abutting a portion of the first ridge disposed along the first side of the floor, the second end of the second beam abutting the second end of the first beam, the first beam, the second beam, the second ridge, and the portion of the first ridge disposed along the first side of the floor between the second beam and the second ridge cooperating to form a recessed portion therebetween, the recessed portion being adapted to receive a lower portion of the first trough of the feed dispensing assemnbly when the feed dispensing assembly is in the assembled position with the first and second side walls of the animal shelter.

23. The improved animal shelter of claim 22 which further comprises:

a third beam disposed on the first side of the floor, the third beam having a first end and a second end, the first end of the third beam abutting the first end of the third ridge, the third beam being disposed on the first side of the floor such that the elongated axis of the third beam is substantially perpendicular to the elongated axis of the third ridge;

a fourth beam disposed on the first side of the floor in a parallel, spatial relationship with the third ridge, the first end of the fourth beam abutting the second end of the third beam, the second end of the fourth beam abutting a portion of the first ridge disposed along the second side of the floor, the third beam, the fourth beam, the third ridge, and the portion of the first ridge disposed along the second side of the floor between the fourth beam and the third ridge cooperating to form a recessed portion therebetween, the recessed portion being adapted to receive a lower portion of the second trough of the feed dispensing assembly when the feed dispensing assembly is in the assembled position with the first and second side walls of the animal shelter.

24. The animal shelter of claim 1 wherein the roof comprises:

a first member having a lower side, an upper side, a forward end, a first end, a rearward, and a second end;

a second member having a lower side, an upper side, a forward end, a first end, a rearward end and a second end; and hinge means for pivotally connecting the forward end of the first member to the rearward end of the second member.

25. The animal shelter of claim 24 wherein the roof further comprises:

a first angularly-disposed member disposed along the first end, the rearward end, and the second end of the first member, the first angularly-disposed member extending from the first member in a downwardly direction away from the first side wall, the second side wall, and the rear wall; and a second angularly-disposed member disposed along the first end, the forward end and the second end of the second member, the second angularly-disposed member extending from the second member in a downwardly direction away from the first side wall, the second side wall and the feed dispenser when the animal shelter is in the assembled position.

26. The animal shelter of claim 25 further comprising a bowl positioned on the upper side of the first member of the roof.

27. The animal shelter of claim 26 further comprising stabilizing means positioned on the upper side of the first member of the roof to secure and stabilize the bowl.

28. The animal shelter of claim 27 wherein the stabilizing means is a recessed portion formed in the upper side of the first member of the roof, the recessed portion adapted to receive a lower end portion of the bowl.

29. The animal shelter of claim 27 wherein the stabilizing means is a rim disposed on the upper side of the first member of the roof, the rim receiving a lower end portion of the bowl.

30. The animal shelter of claim 18 which further comprises channel-forming means formed on the first and second side walls for slidably receiving the feed dispenser and stabilizing the feed dispenser between the first and second side walls.

31. The animal shelter of claim 30 wherein the channel-forming means comprises:

a first flange disposed on the first end of the first side wall such that the first flange extends from the second side of the first side wall and is disposed substantially perpendicular to the plane of the first side wall;

a second flange disposed on the second side of the first side wall in a parallel, spatial relationship with the first flange of the first side wall, the first and second flanges of the first side wall cooperating with a portion of the first side wall disposed therebetween to form a channel for slidably receiving one of the feed dispenser;

a first flange disposed on the first end of the second side wall such that the first flange extends from the first side of the second side wall and is disposed substantially perpendicular to the plane of the second side wall; and a second flange disposed on the first side of the second side wall in a parallel, spatial relationship with the first flange of the second side wall, the first and second flanges of the second side wall cooperating with a portion of the second side wall disposed therebetween to form a channel for slidably receiving a second end of the feed dispenser.

32. The improved animal shelter of claim 31 wherein the floor is a substantially rectangular-shaped member having a first side, a second side, a forward end, a first end, a rearward end, and a second end, and the first connecting means comprises:

a ridge disposed on the first side of the floor, the ridge being disposed substantially perpendicular to the plane of the floor and extending along the forward end, the first end, the rearward end and the second end of the floor; and ridge engaging means disposed on the first side wall, the rear wall and the second side wall for engaging the ridge to secure the first side wall, the rear wall and the second side wall to the floor.

33. The improved animal shelter of claim 32 wherein the ridge engaging means comprises a flange having a ridge engaging channel formed therein.

34. The improved animal shelter of claim 32 wherein the flange disposed on the first side wall extends between the second end of the first side wall and the second flange of the channel forming means of the first side wall.

35. The improved animal shelter of claim 32 wherein the flange disposed on the second side wall extends between the second end of the second side wall and the second flange of the channel forming means of the first side wall.

36. The improved animal shelter of claim 18 wherein the second connecting means comprises:

a first flange disposed on the second end of the first side wall, and extending therefrom such that in an assembled position of the first side wall, the rear wall, and the floor, the first flange engages the first end of the rear wall; and a second flange disposed on the second end of the second side wall and extending therefrom such that in an assembled position of the second side wall, the rear wall, and the floor the second flange engages the second end of the rear wall.

37. The animal shelter of claim 32 wherein the ridge disposed along the forward end of the floor is provided with an opening in a central portion thereof and wherein the feed dispenser assembly comprises:

a body member having an upper end and a lower end, the body member further characterized as having a cavity formed therein, the cavity extending from the upper end of the body member to the lower end; and a feed trough assembly having a cavity formed therein which openly communicates with the cavity in the body member, the feed trough assembly being disposed adjacent the lower end of the body member and extending a distance from the body member such that a portion of the cavity in the trough assembly is accessible to an animal.

38. The improved animal shelter of claim 37 wherein the body member of the feed dispenser comprises:
a first side wall;
a substantially parallel, spatially disposed second side wall;
a first end wall; and,
a spatially disposed second end wall, the first side wall, the first end wall, the second side wall and the second end wall being connected such that the body member is provided with a rectangular-shaped configuration having the cavity formed therein.

39. The improved animal shelter of claim 38 wherein the opening extending through the feed dispenser is formed through the first and second side walls of the body member, and wherein the body member further comprises:

partition means disposed between the first and second side members and around the opening formed therein for sealing the cavity in the body member from the opening extending therethrough, the partition means dividing the cavity in the body member into a first cavity portion and a second cavity portion.

40. The improved animal shelter of claim 39 wherein the partition means disposed between the first and second side walls of the body member along an upper portion of the opening formed therethrough cooperates with one of the first and second end walls, and the first and second side walls to support a water-dispensing assembly in one of the first and second portions of the cavity within the body member.

41. The improved animal shelter of claim 40 wherein the trough assembly comprises:

a first trough disposed adjacent the lower end of the body member and openly communicating with the first portion of the cavity; and a second trough disposed adjacent the lower end of the body member and openly communicating with the second portion of the cavity formed therein.

42. The improved animal shelter of claim 41 wherein the first trough is provided with a ridge engaging channel therein and the second trough is provided with a ridge engaging channel therein, the ridge engaging channel of the first trough adapted to engage one portion of the ridge disposed along the forward end of the floor, and the ridge engaging channel of the second trough adapted to engage the other portion of the ridge disposed along the forward end of the floor when the trough assembly is positioned between the first and second side walls of the animal shelter.

43. The animal shelter of claim 42 wherein the roof comprises:

a first member having a forward end and a rearward end;

a second member having a forward end and a rearward end; and hinge means for connecting the forward end of the first member to the rearward end of the second member.

44. The animal shelter of claim 43 which further comprises a bowl positionable on the first member of the roof.

45. The animal shelter of claim 42 wherein the roof comprises:

a first member having a lower side, an upper side, a forward end, a first end, a rearward end, and a second end;

a second member having a lower side, an upper side, a forward end, a first end, a rearward end and a second end; and hinge means for pivotally connecting the forward end of the first member to the rearward end of the second member.

46. The animal shelter of claim 45 wherein the roof further comprises:

a first angularly-disposed member disposed along the first end, the rearward end, and the second end of the first member, the first angularly-disposed member extending from the first member in a downwardly direction away from the first side wall, the second side wall, and the rear wall; and a second angularly-disposed member disposed along the first end, the forward end and the second end of the second member, the second angularly-disposed member extending from the second member in a downwardly direction away from the first side wall, the second side wall and the feed dispenser when the animal shelter is in the assembled position.

47. A feed dispensing assembly for a pet shelter wherein the pet shelter includes a plurality of side walls interconnected to form an interior space adapted to receive a pet, one of the side walls having an entry opening of a size sufficient to allow the pet to enter and exit the pet shelter, and a roof structure disposed on the side walls, one of the side walls including the feed dispensing assembly which comprises:

a body member having an upper end and a lower end, the body member further characterized as having a cavity formed therein, the cavity extending from the upper end of the body member to the lower end; and a feed trough assembly having a first end and a second end, the feed trough further characterized as having a cavity formed therein, the first end of the feed trough being disposed adjacent the lower end of the body member such that in an assembled position the second end of the feed trough extends from the body member in a direction substantially perpendicular to the body member and the cavity of the feed trough assembly openingly communicates with the cavity of the body member, wherein the body member comprises:
a first side wall;
a substantially parallel, spatially disposed second side wall;
a first end wall; and a spatially disposed second end wall, the first side wall, the first end wall, the second side wall and the second end wall being connected such that the body member is provided with a rectangular-shaped configuration having the cavity formed therein, and wherein the body member is provided with said entry opening therein, the opening being formed through the first and second side walls of the body member and the feed dispensing assembly is employed as the front wall of the shelter, the body member further comprises:

partition means disposed between the first and second side members and around the opening formed therein for sealing the cavity in the body member from the opening extending therethrough, the partition means dividing the cavity in the body member into a first cavity portion and a second cavity portion.

48. The feed dispensing assembly of claim 47 wherein the partition means disposed between the first and second side walls of the body member along an upper portion of the opening formed therethrough cooperates with one of the first and second end walls, and the first and second side walls to support a water-dispensing assembly in one of the first and second portions of the cavity within the body member.

49. The feed dispensing assembly of claim 48 wherein the trough assembly comprises:

a first trough disposed adjacent the lower end of the body member and openly communicating with the first portion of the cavity; and a second trough disposed adjacent the lower end of the body member and openly communicating with the second portion of the cavity formed therein.

50. The feeding dispensing assembly of claim 49 wherein the second side wall of the body member is provided with a pair of arcuate-shaped openings in the lower end thereof, one of the arcuate-shaped openings being positioned above the first trough, the second of the arcuate-shaped openings being positioned above the second trough.

* * * * *